US012613424B2

(12) United States Patent
Glebov et al.

(10) Patent No.: US 12,613,424 B2
(45) Date of Patent: Apr. 28, 2026

(54) APPARATUS FOR SPECTRALLY COMBINING BROADBAND LASER BEAMS BY VOLUME BRAGG GRATINGS

(71) Applicant: IPG PHOTONICS CORPORATION, Marlborough, MA (US)

(72) Inventors: Leonid Glebov, Oxford, MA (US);
Ivan Divliansky, Oxford, MA (US);
Oussama Mhibik, Oxford, MA (US);
Elena Shirshneva, Oxford, MA (US);
Vadim Smirnov, Oxford, MA (US)

(73) Assignees: IPG PHOTONICS CORPORATION, Marlborough, MA (US); THE UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 251 days.

(21) Appl. No.: 18/033,955

(22) PCT Filed: Jun. 8, 2021

(86) PCT No.: PCT/US2021/036330
§ 371 (c)(1),
(2) Date: Apr. 26, 2023

(87) PCT Pub. No.: WO2022/093326
PCT Pub. Date: May 5, 2022

(65) Prior Publication Data
US 2023/0393408 A1      Dec. 7, 2023

Related U.S. Application Data

(60) Provisional application No. 63/105,968, filed on Oct. 27, 2020.

(51) Int. Cl.
*G02B 27/10* (2006.01)
*G02B 5/18* (2006.01)
*G02B 27/42* (2006.01)

(52) U.S. Cl.
CPC ....... *G02B 27/1006* (2013.01); *G02B 5/1814* (2013.01); *G02B 27/1086* (2013.01); *G02B 27/4233* (2013.01); *G02B 2005/1804* (2013.01)

(58) Field of Classification Search
CPC ............ G02B 27/1006; G02B 27/1086; G02B 27/4233; G02B 27/4283; G02B 5/1814;
(Continued)

(56) References Cited

U.S. PATENT DOCUMENTS 6,192,062 B1 * 2/2001 Sanchez-Rubio ..... H01S 5/4062
                                                            372/98
6,673,497 B2 * 1/2004 Efimov ................ G03H 1/0248
                                                            430/1

(Continued)

FOREIGN PATENT DOCUMENTS

CN          103560384 A  *  2/2014
WO    WO-2017197883 A1 * 11/2017

OTHER PUBLICATIONS

Igor V. Ciapurin et al., Modeling of Guassian Beam Diffraction on Volume Bragg Gratings in PTR Glass, 5742 Proceedings of SPIE 183-194 (2005). (Year: 2005).*

(Continued)

*Primary Examiner* — Ricky L Mack
(74) *Attorney, Agent, or Firm* — Yuri B. Kateshov, Esq.

(57) ABSTRACT

A beam combiner configured to spectrally combine multiple beams includes at least one pair of identically configured TVBGs. The TVBGs are spaced apart along a light path and aligned at respective "+" and "−" Bragg angles. The upstream TVBGs diffracts a first beam, which is incident (Continued)

thereon at one of the Bragg angles, so that spectral components of this beams diverge from one another defining thus a fan-shaped beam at the output of the upstream TVBG. Upon launching the diffracted first beam to the downstream TVBG at the other Bragg angle, its spectral components again are diffracted but in the direction opposite to that provided by the upstream TVBG. Thus, the dispersion effects in respective TVBGs cancel out each other. Another beam is incident on and transmitted by the downstream TVBG which combines the twice diffracted and transmitted beams into a collimated combined beam.

16 Claims, 15 Drawing Sheets

(58) Field of Classification Search
CPC ........ G02B 2005/1804; G02B 6/29311; H01S 5/4012; H01S 5/4087
See application file for complete search history.

(56) References Cited

U.S. PATENT DOCUMENTS

| | | | | |
|---|---|---|---|---|
| 7,031,573 | B2 * | 4/2006 | Volodin | G02B 6/4246 |
| | | | | 385/37 |
| 7,233,442 | B1 * | 6/2007 | Brown | G02B 27/144 |
| | | | | 359/556 |
| 7,609,743 | B2 * | 10/2009 | Glebov | H01S 3/08045 |
| | | | | 372/102 |
| 9,551,830 | B1 * | 1/2017 | Anderson | G02B 6/34 |
| 9,690,107 | B2 * | 6/2017 | Negoita | H01S 3/0071 |
| 9,696,476 | B1 * | 7/2017 | Glebov | G02B 5/1857 |
| 2005/0248820 | A1 * | 11/2005 | Moser | G02B 27/145 |
| | | | | 359/15 |
| 2006/0109876 | A1 * | 5/2006 | Donoghue | G02B 27/1086 |
| | | | | 372/102 |
| 2016/0062042 | A1 * | 3/2016 | Volodin | G02B 5/1857 |
| | | | | 385/24 |
| 2017/0153373 | A1 * | 6/2017 | Divliansky | G02B 6/34 |
| 2024/0019708 | A1 * | 1/2024 | Glebov | G02B 27/4233 |

OTHER PUBLICATIONS

Armen Sevian et al., Spectral Beam Combining with Volume Bragg Gratings: Cross-talk Analysis and Optimization Schemes, 6216 Proceedings of SPIE 62160V-1 to 62160V-12 (2006). (Year: 2006).*
Apurva Jain et al. Coherent and Spectral Beam Combining of Fiber Lasers Using Volume Bragg Gratings, 7686 Proceedings of SPIE 768615-1 10 768615-8 (2010). (Year: 2010).*
Zhan Sheng-bao et al., Spectral Beam Combining of Fiber Lasers Based on Transmitting Volume Bragg Grating, 42 Optics & Laser Technology 308-312 (2010). (Year: 2010).*
Liangning Hao et al., Optimization Research of Transmitting Volume Bragg Gratings for Spectrum Beam Combining, 2012, pp. 663-634 [online], [retrieved Apr. 12, 2025], retrieved from the Internet <URL: https://ieeexplore.ieee.org/stamp/stamp.jsp?tp=&arnumber=6276780>. (Year: 2012).*
Derrek R. Drachenberg et al., Ultimate Efficiency of Spectral Beam Combining by Volume Bragg Gratings, 52 Applied Optics 7233-7242 (2013). (Year: 2013).*

* cited by examiner

APPARATUS FOR SPECTRALLY COMBINING BROADBAND LASER BEAMS BY VOLUME BRAGG GRATINGS

BACKGROUND OF THE DISCLOSURE

Field of the Disclosure

The present disclosure relates to laser-beam combining techniques. In particular, the disclosure relates to a system of multiple transmission volume Bragg gratings which spectrally combine high power broadband laser beams into a high power high-brightness broadband collimated beam.

Background Art Discussion

Numerous industrial and military applications require high power laser beams. Typically, high power single mode (SM) and low mode (LM) laser beams, i.e., high quality laser beams, are in particular demand for a variety of applications. However, nonlinear and thermal effects restrict power of a stand-alone SM laser with narrow bandwidth (up to 3 nm) to about 1 kW, while a SM laser with broad bandwidth (4-10 nm) can output up to 10 kW. The limited scalability has a variety of reasons including, among others, finite pump brightness, limited doping concentrations and non-linear effects. While waveguide designs of SM fiber lasers may somewhat mitigate the detrimental effects of Raman and Brillouin nonlinear effects which increases the scalability limit, the fiber core diameter nonnegotiably curtails this limit.

The high power limit can be much higher if two or more SM outputs from respective fiber lasers are combined together. Various methods of beam combining include, among others, coherent (CBC) and spectral (SBC) beam-combining techniques.

The CBC is realized by mutually coherent beams, i.e., the beams which propagate at the same wavelength such that the phase difference between/among their respective waves is constant. This technique requires controlling relative phases of SM beams from respective sources so as to provide constructive interference between the output beams. The phase control includes active or passive feedback providing for a stable coherent addition. However, the required control increases a structural complexity of the CBC system.

The SBC or wavelength beam combining is an incoherent beam combining technique which does not require controlling the phase. The goal of SBC is to combine two or more high-power laser beams propagating at respective different wavelengths into a combined beam which has not only a high power, but also preserved beam quality which determines spatial brightness. Thus, while the spectral brightness in a spectral combining system based on volume Bragg gratings (VBGs) decreases because of the spectral broadening, the spatial brightness increases by transmitting a beam at a non-resonant wavelength and diffracting a beam at a resonant (Bragg) wavelength, explained in detail below. Based on foregoing, the main advantage of SBC over CBC is the structural simplicity since there is no need to monitor and adjust the phases of individual beams.

Both CBS and SBC employ spectrally dispersive optical elements including, among others, prisms, surface diffractive gratings and volume Bragg gratings (VBGs). The prisms and surface diffractive gratings require the use of narrow band laser sources because the angular dispersion of these elements results in dramatic increase of divergence in a plane of refraction or diffraction. Yet, as mentioned above, the narrowband lasers output a limited-power beam. To obtain higher powers, for example 2-100 kW, a great number of SM narrow-band lasers should operate simultaneously. However, a multi-laser system has quite a few optical and dimensional problems.

The VBGs can be recorded in a photo-thermo-refractive (PTR) glass which is known to function well under kW-level power loads. The fabrication of these gratings includes holographically recording the interference fringe pattern. The thermal treatment of the exposed glass sample produces a permanent spatial refractive index modulation (RIM) inside it.

The diffraction of light in the VBG occurs only at a resonant (Bragg) wavelength and two specific angles of incidence known as "+" and "−" Bragg angles. These conditions are known as Bragg conditions. Dependence of the diffraction efficiency of the VBG on the angle of incidence and wavelength has a central lobe 16 and a number of side lobes 18 separated by zeros, as illustrated in FIGS. 1A and 1B. If a beam at a Bragg wavelength (e.g. 1075 nm) is incident on this grating at one of the Bragg angles, the VBG diffracts it with maximum diffraction efficiency. When another beam at, for example 1069.3 nm wavelength, which corresponds to one of the zeros of the spectrum, illuminates the VBG at the other Bragg angle for the 1075 nm wavelength, the VBG transmits this beam in the same direction as the diffracted 1075 nm beam.

The graphs of respective FIGS. 1A and 1B illustrate a VBG designed with a period A of 1.5 μm and thickness of 1 mm. As can be seen, the illustrated VBG has 100% diffraction efficiency for radiation at 1075 nm (Bragg or resonant wavelength) which is launched at 32.6° (Bragg angle in the air). Both spectral and angular patterns have central lobe 16 of the diffraction efficiency spectrum and a number of side lobes 18 separated by zeros which correspond to minimal diffraction efficiency. The full-width half-maximum (FWHM) wavelength and angular selectivity are $\Delta\lambda$=5.2 nm and $\Delta\theta$=1.8 mrad, respectively. The modelling of VBG properties is based on the coupled wave theory well known to one of ordinary skill in the laser arts.

There are two basic types of VBG: transmission VBG (TVBG) and reflection VBG (RVBG) both providing diffraction of light which satisfies the Bragg condition. The TVBG and RVBG have different capabilities of combining beams. The standard RVBGs effectively combine only narrowband beams with a spectral width not exceeding a small fraction of nanometer which limits RVBGs usefulness for broadband high power laser systems.

In contrast to RVBGs, TVBGs can effectively diffract radiation that has a broad spectral width ranging from above 3 nm to 10 nm (and greater) which is quite typical for SM fiber lasers outputting a 2 to 10 kW SM beam in a 1 μm wavelength range. Based on the foregoing, the TVBG's ability to diffract high-power, broad spectral width radiation renders this type of gratings particularly attractive for combining high-power broadband beams. If a TVBG diffracts one beam with maximum efficiency at, for example, a (+) Bragg angle and transmits another beam at the opposite (−) Bragg angle, diffracted and transmitted beams merge into a combined collimated high-brightness beam.

FIG. 2 illustrates the operation of TVBG 10 combining two laser beams 12 and 14 at two different wavelengths λ1, λ2 respectively which are incident on the same side at "+" and "−" Bragg angles for the λ1 wavelength. The beam 12 at the λ1 wavelength corresponding to 1075 nm in FIG. 1A, is in resonance with the grating and is mostly diffracted (deflected by twice the Bragg angle). The second beam 14 at the second λ2, for example 1069.3 nm, is in the first minimum (or zero) of the diffraction efficiency curve and passes through TVBG 10 with a minimal loss. In other words, TVBG 10 does not meaningfully diffract beam 14, but transmits it. Ideally, diffracted beam 12 and transmitted beam 14 would be overlapped and collinear both in near and far optical fields, i.e., merged into a single output collimated spatially bright beam 20. But the reality is different since diffracted beam 12 is fanned at the output as shown by double-arrow 15 and explained below.

However, using TVBGs for combining broadband beams poses a few problems. The root of at least some of these problems is a beam divergence. It causes decreasing the beam's power density and spatial brightness of the combined beam. The following explains physical phenomena causing the beams diffracted by a TVBG to diverge.

As one of ordinary skill knows, any grating introduces angular dispersion illustrated in FIG. 3. In fact, the angular dispersion is perhaps one of the most attractive features of any type of grating exactly because of its spectral selectivity. To understand the nature of the latter, imagine a single polychromatic collimated beam at the Bragg wavelength, such as beam 12 incident on TVBG 10 at the Bragg angle. The polychromatic beam 12 consists of central wavelength λ1B (Bragg wavelength) and slightly offset spectral components $\lambda_{1L}$, and $\lambda_{1S}$ (long and short wavelengths, respectively). While all spectral components in the incident beam are parallel, TVBG 10 diffracts the entire beam, where different wavelengths $\lambda_{1L}$, λ1S and λ1B are deflected at respective different angles. Both $\lambda_{1S}$ and $\lambda_{1L}$ spectral components, respectively diverge from the resonant Bragg component. This ability of the grating to recognize different wavelengths makes it so attractive for a variety of applications.

However, the above-mentioned feature of the grating is undesirable when it functions as a broadband beam combiner. Yes, the spectral selectivity of the grating is still paramount to the beam combining, the fact that the diffracted beam diverges is highly undesirable for the purposes of this invention for the following reason. The divergent or fan-shaped beam has a lower spatial brightness. Yet many industrial applications require high spatial brightness beams characterized by spectral components which are all parallel, i.e., collimated near diffraction-limited beams.

Another problem associated with TVBGs is a thermal lensing phenomenon affecting the beam's divergence. When a high-power laser beam propagates through a TVBG, the latter partially absorbs the beam which then releases light energy heating the TVBG. The heating causes a change of refractive index and expansion of PTR glass. The temperature distribution in the TVBG is not uniform which leads to the formation of a lens. Hence, this phenomenon is known as thermal lensing.

The thermal lensing distorts the divergence and quality of the diffracted beam which has the highest power density in its central regions and low power density in the wing regions. To compensate for the lens, various phase masks are successfully used. Yet, the known phase masks all are monochromatic and cannot shape effectively broadband beams.

Still another problem associated with TVBGs used for combining broadband beams is leakage between spectral channels or beams. Returning to FIG. 2, the leakage occurs when transmitted beam 14, i.e., the beam which should propagate without being diffracted, is still partially diffracted. To avoid it, the spectral width of TBG 10 must be broad enough to diffract broadband beam 12, but not beam

4

14. For that side lobes 18 of FIG. 1A, which spread to wider spectral range, should be somewhat suppressed and better yet completely removed. The amplitude of side lobes is inherent to VBGs with a uniform distribution of refractive index modulation (RIM) in the volume of PTR media. To avoid significant leakage between spectral channels, the distance between them should be at least 3Δλ. This means that for Yb-doped fiber lasers, as well as for Cr, gas diode lasers, which are important for many industrial applications, maximum three-four channels/laser sources could be used for effective SBC. However, the limited number of sources curtails the power scalability of TVBGs. The same problem of scalability would appear for other laser sources, such as a fiber, bulk solid state, semiconductor, and gas emitters.

Based on the foregoing it is desirable to have a TVBG-based beam combiner, utilizing a SBC technique for multiplexing broadband beams into a combined high-power, high-brightness collimated beam, which is configured to:

minimize or preferably eliminate the effect of the angular dispersion on diffracted beams, minimize the lensing effect, and minimize the leakage among multiple broadband beams (or channels).

BRIEF DESCRIPTION OF THE DRAWING

The disclosed combiner addresses the above-mentioned problems and satisfies the existing needs. The inventive structure includes at least one pair of identically configured TVBGs which function as a beam combiner merging high-power broadband beams into a combined broadband multi-KW collimated output beam.

The inventive structure is configured to compensate angular dispersion of a TVBG. Some of the schematics dealing with the angular dispersion each are based on one or more pairs of two identically structured standard TVBGs. The TVBGs of each pair are spaced apart along a light path and aligned at respective "+" and "−" Bragg angles. The upstream TVBGs diffracts a first beam which is incident thereon at, for example, "+" Bragg angle. Due to the inherent angular dispersion, the beam's spectral components diverge at the output of the TVBG. Upon launching the diffracted first beam to the downstream TVBG at the "−" Bragg angle, its spectral components again are diffracted but in the direction opposite to that provided by the upstream TVBG. Thus, the dispersion effects in respective TVBGs cancel out each other. This allows the downstream TVBG to output a multi-KW collimated broadband output beam at the same angle as the incident Bragg angle of the beam incident on the upstream TVBG.

Figure 1A:
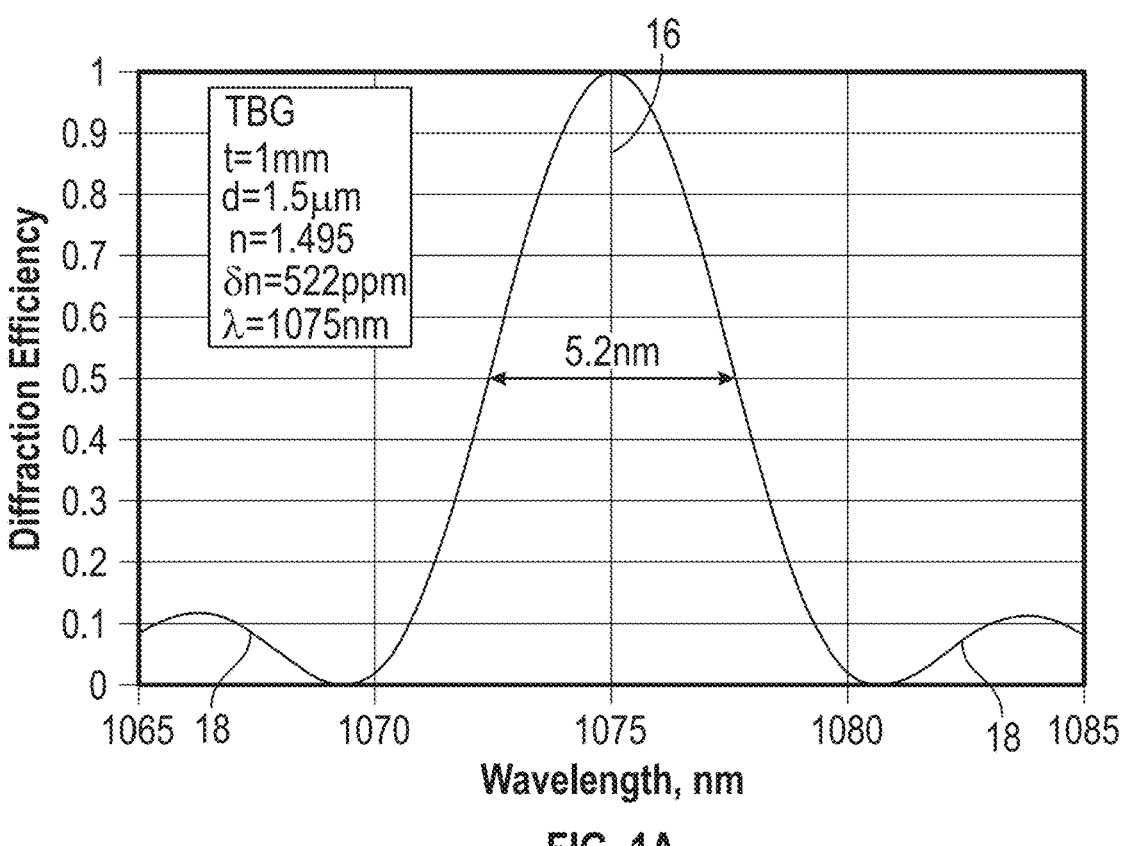

The downstream TVBG thus functions as a combining TVBG for the diffracted and second transmitted broadband beams. The second beam is centered on a wavelength different from the Bragg wavelength of the first beam and is directly incident on the downstream TVBG which transmits it. The twice-diffracted first and transmitted second beams overlap one another in both near and far optical fields thus merging into an output spatially bright broadband collimated beam. As one of ordinary skill readily understands, the number of aligned pairs of TVBGs is not limited to just a single pair and can include multiple pairs which are positioned so that multiple broadband beams eventually overlap one another in the utmost downstream TVBGs outputting a single high-brightness high-power combined beam.

Still another schematic takes advantage of the PTR glass which allows recording several standard TVBGs in a single glass plate. While the TVBGs completely overlap each other within the plate, they are optically independent. Accordingly, this simplest schematic has two upstream "−" and "+" TVBGs which diffract respective beams at Bragg wavelengths which are offset from one another. The diffracted beams then are incident on respective "+" and "−" downstream TVBGs written in the same glass plate. The third beam, which corresponds to zeros of both downstream TVBGs would be transmitted by it. The twice-diffracted beams and the transmitted beam overlap one another while exiting the PTR glass so as to form a single high power broadband collimated output beam.

The aspect of the disclosure addressing the leakage problem includes forming a specified (e.g. Gaussian) profile of RIM in the direction perpendicular to the grating vector which results in suppression of side lobes. In particular, the disclosed TVBG is configured with an optimized apodization (or spatially non-uniform coupling) profile enabling almost a complete suppression of side lobes which may lead to the decreased distance between channels and therefore increased number of these channels.

Another aspect of the disclosure deals with a thermal lensing compensation in the above-disclosed broadband beam combiner. One of the schematics that minimizes the thermal lensing phenomenon includes the inventive combiner configured with the smallest possible thickness. The latter decreases absorption of radiation limiting thus heat generation, accelerates thermal conductivity to the surfaces, reduces the optical path, and increases the focal length of the lens.

Other schematics minimizing the temperature gradient across the TVBG are based on shaping a SM broadband beam so that its Gaussian intensity distribution is transformed to a flat top intensity distribution. The lower the power density gradient between the central and wing regions of the SM beam, the more uniform the heat generation in the grating. The flat top beam has a substantially constant power density through the beam's cross-section which is about half the peak power of the Gaussian beam. However, the average power is practically the same.

One of these beam-shaping schematics includes the inventive combiner configured with a holographic achromatic phase mask created in a dedicated PTR glass plate which is positioned along a light path downstream from the combining TVBG. In contrast to the known monochromatic masks, the holographic mask effectively operates with broadband beams. It is possible to have both TVBG and mask in the same PTR plate.

In accordance with another schematic of this aspect, the beam combiner disclosed in the above-discussed aspects additionally includes a separate holographic phase mask which transmits a broadband SM beam while converting it to an optical vortex (Laguerre-Gaussian beam). When the converted beam merges with a diffracted beam, the radial intensity distribution of the combined beam assumes the flat top profile.

Still other aspects, embodiments, and advantages of these example aspects and embodiments, are disclosed in detail below. Moreover, both the foregoing information and the following detailed description are merely illustrative examples of various aspects and embodiments, and are intended to provide an overview or framework for understanding the nature and character of the claimed aspects and embodiments. The features of respective schematics illustrating any of the above-disclosed aspects can be fully incorporated in any of the schematics representing two other disclosed-above aspects.

6

BRIEF DESCRIPTION OF THE DRAWINGS

Figure 1B:
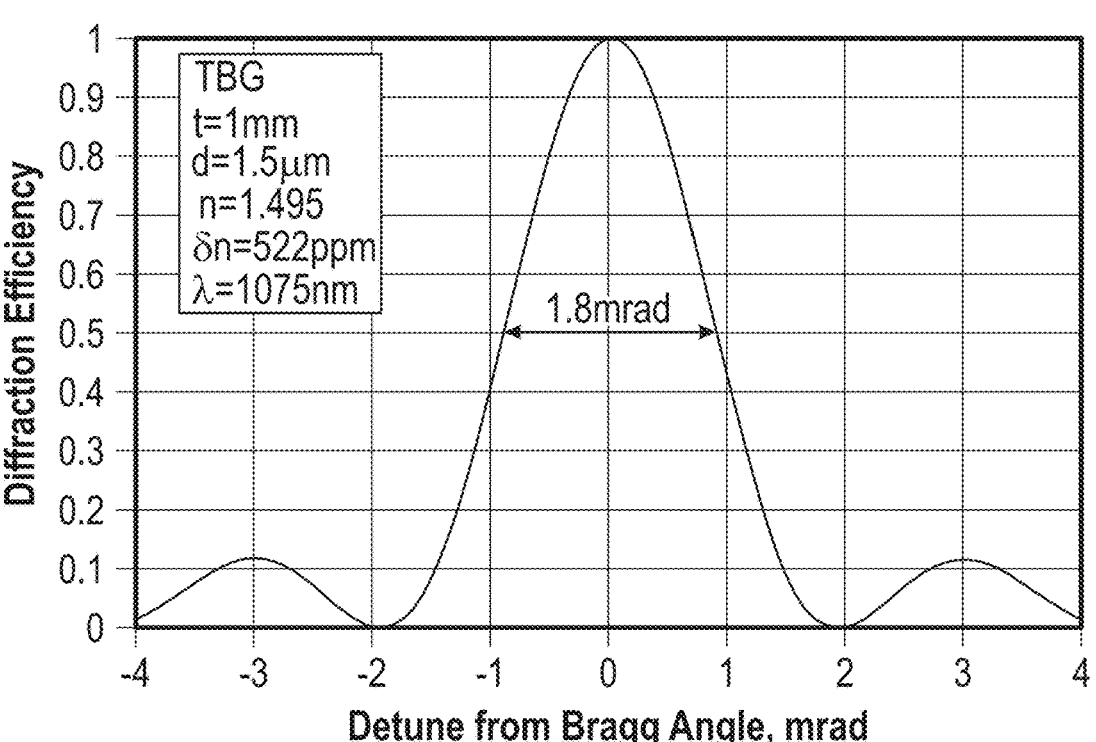

The above and other features will become more apparent with reference to the accompanying figures, which are not drawn to scale. The figures provide an illustration and a further understanding of the various aspects and schematics, and constitute a part of this specification, but do not represent the limits of any particular schematic or aspect. In the drawings, each identical or nearly identical component that appears in various figures is denoted by a like numeral. For purposes of clarity, not every component may have the same reference numeral. In the figures:

FIGS. 1A and 1B illustrate dependence of diffraction efficiency of an exemplary TVBG on wavelength and angle of incidence, respectively.

Figure 2:
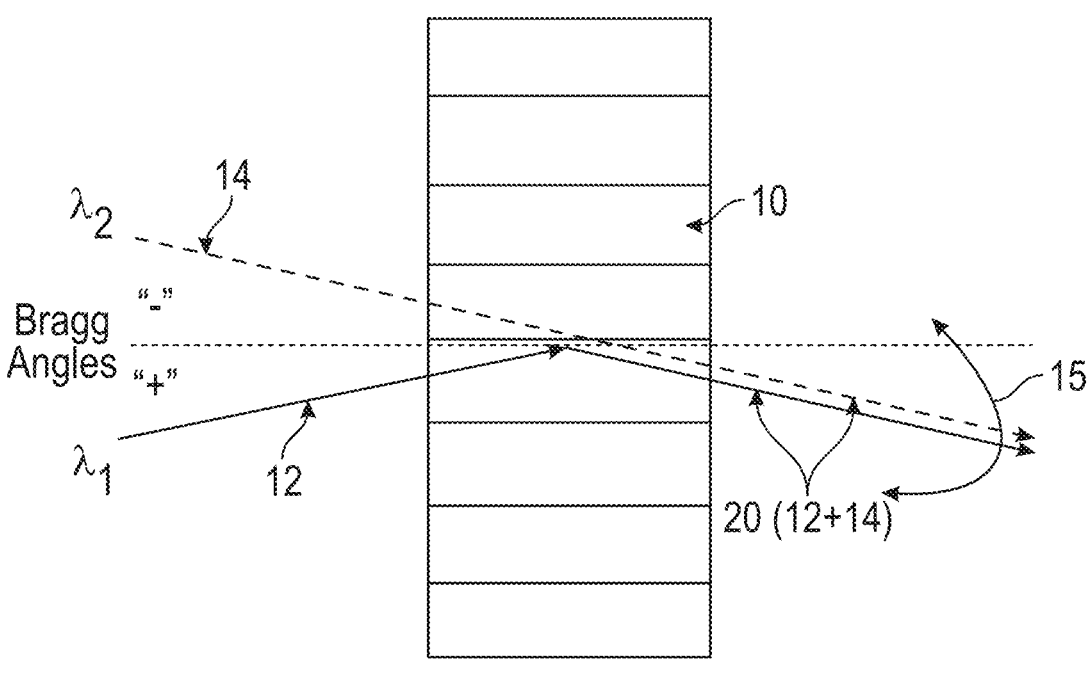

FIG. 2 illustrates spectral combining by a single TVBG.

Figure 3:
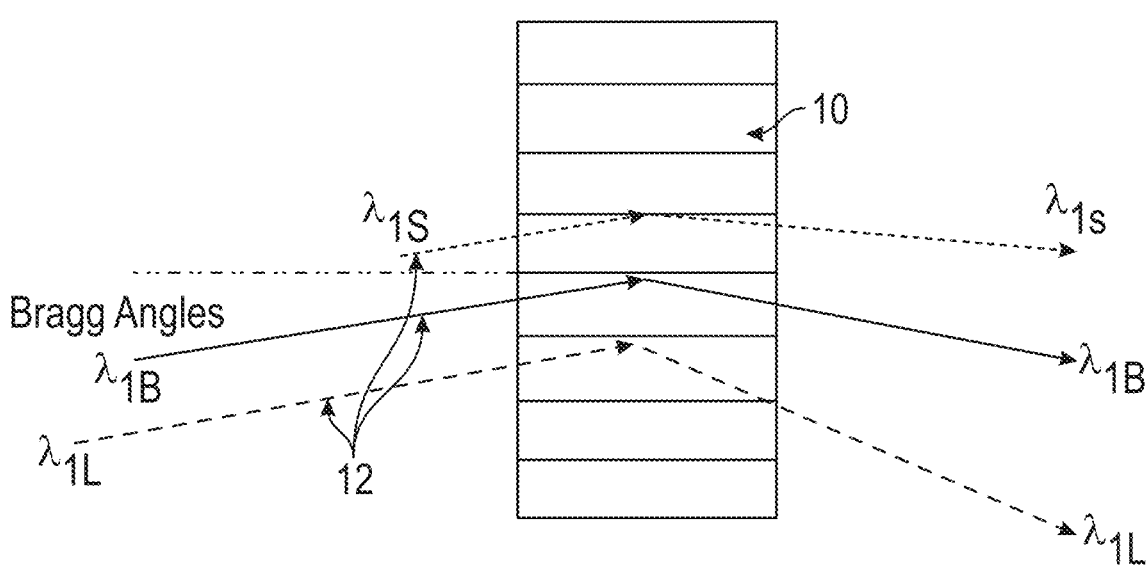

FIG. 3 illustrates the angular dispersion of spectral components of a polychromatic beam diffracted by the TVBG of FIG. 2.

Figure 4:
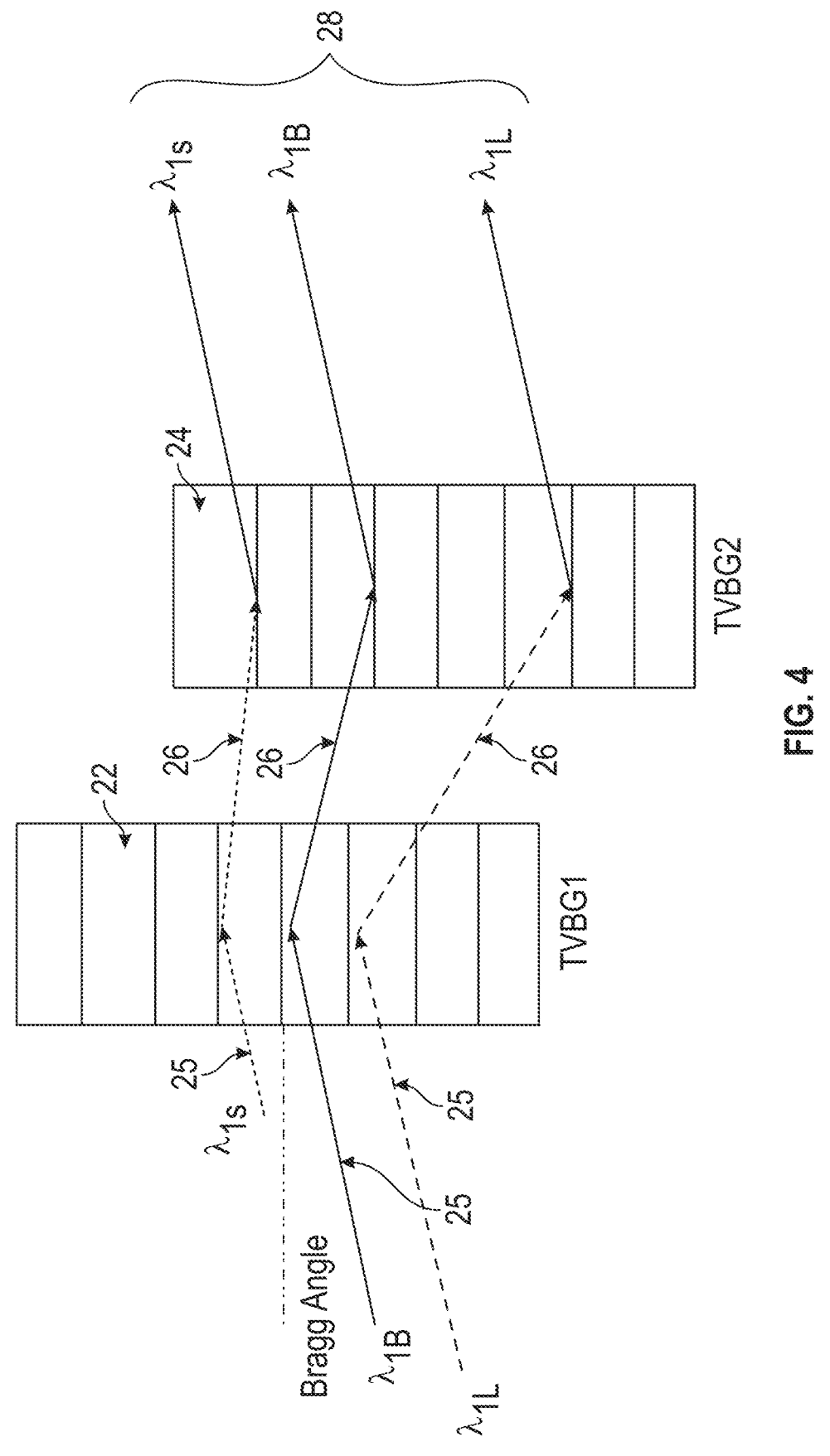

FIG. 4 illustrates the inventive schematic including two sequentially positioned TVBGs which, in combination, eliminate the angular dispersion of spectral components of a polychromatic beam.

Figure 5:
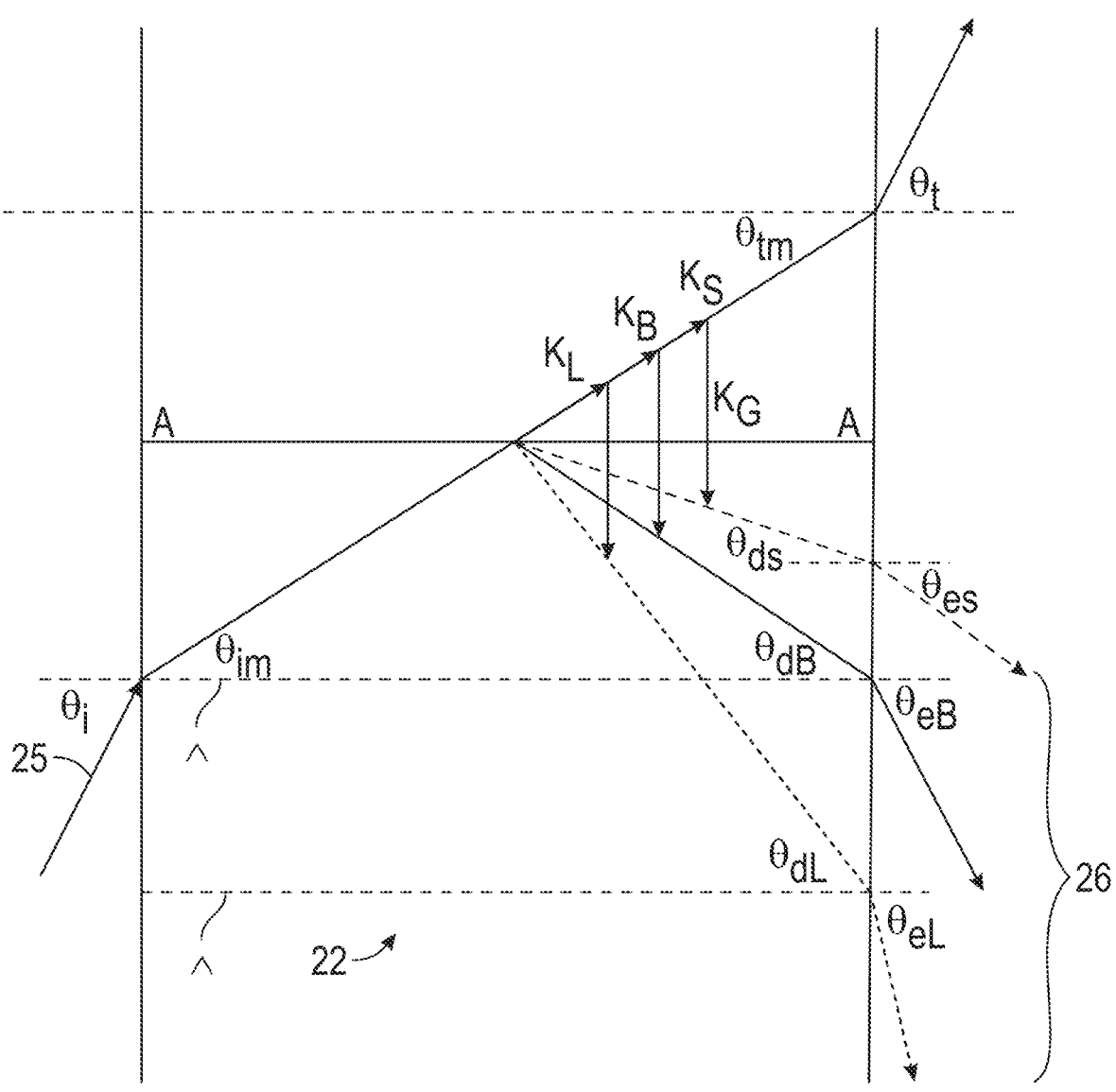

FIG. 5 illustrates ray tracing of multiwavelength plane wave diffraction with the wave being incident on a TVBG at a positive Bragg angle.

Figure 6:
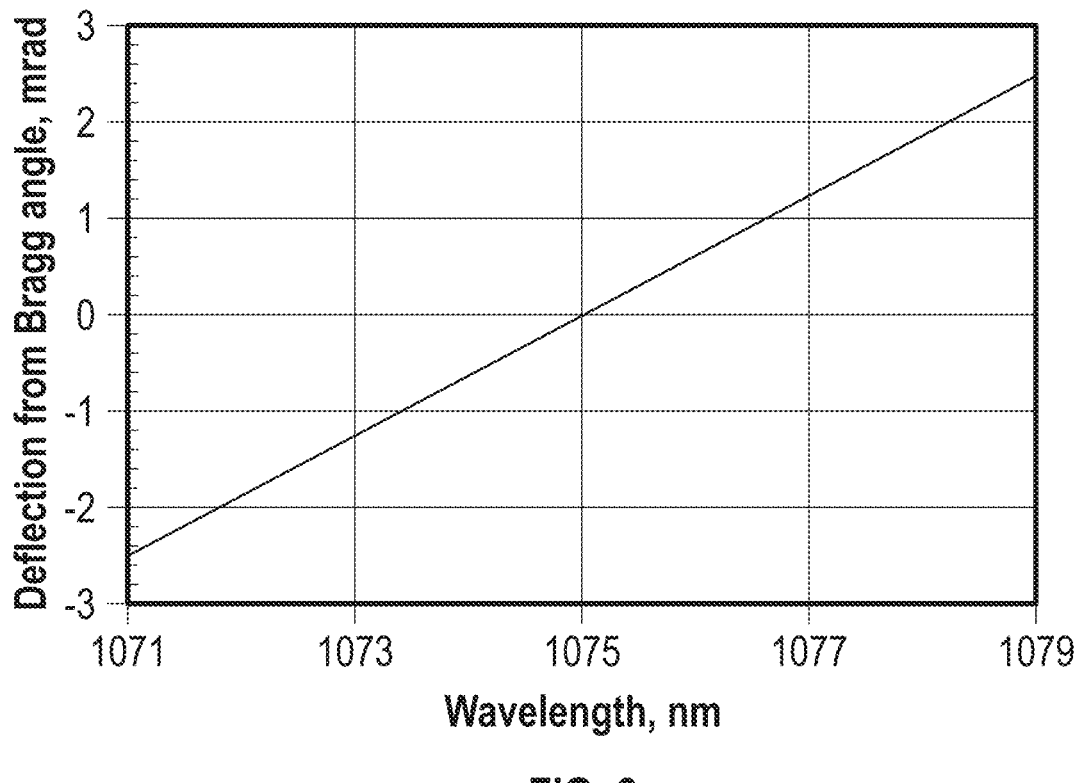

FIG. 6 illustrates the dependence of the diffraction angle in the TVBG of FIG. 5 on wavelength for excitation at Bragg angle for a 1075 nm wavelength.

Figure 7:
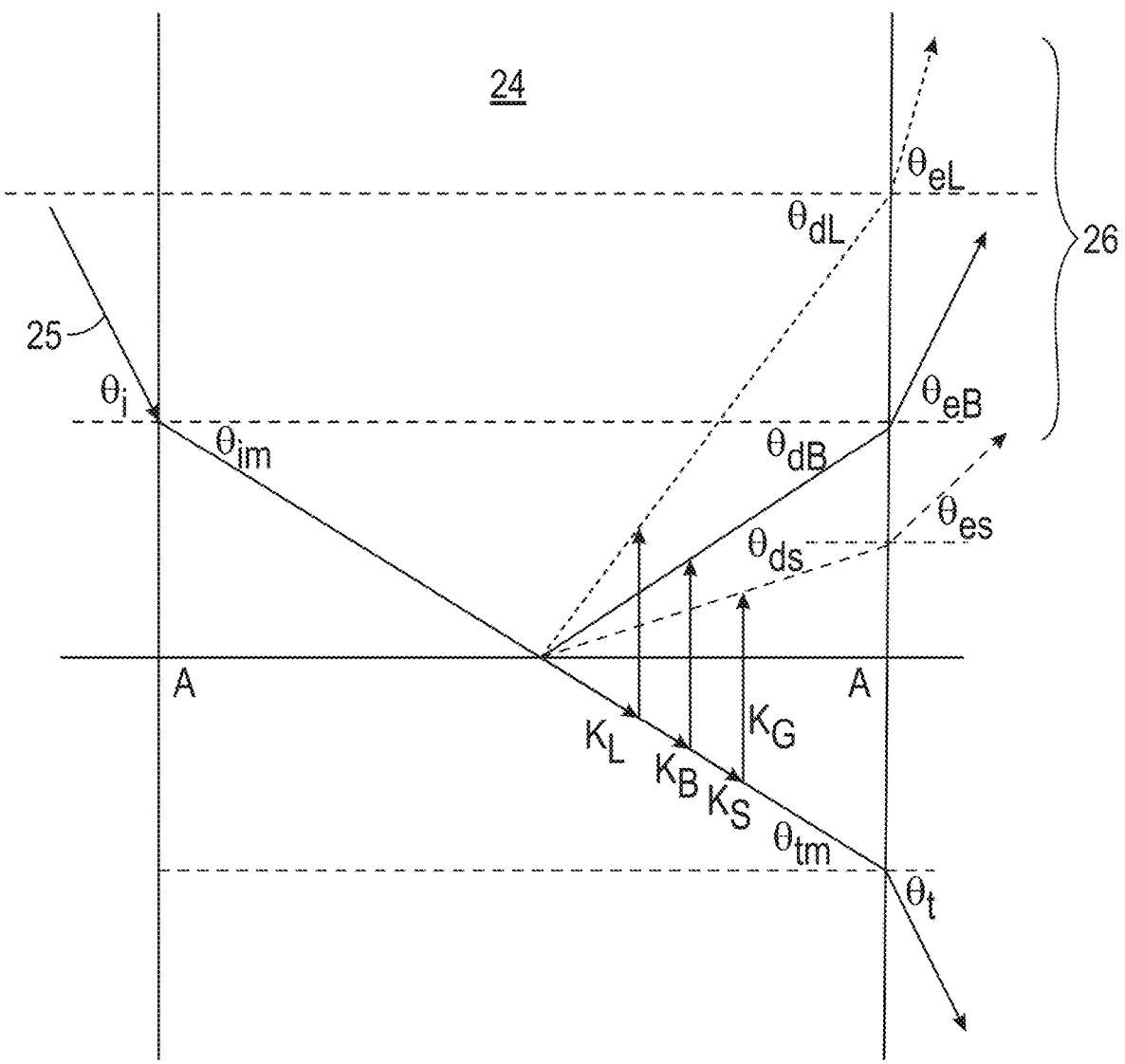

FIG. 7 illustrates ray tracing of multiwavelength plane wave diffraction with the wave being incident on the TVBG at a negative Bragg angle.

Figure 8:
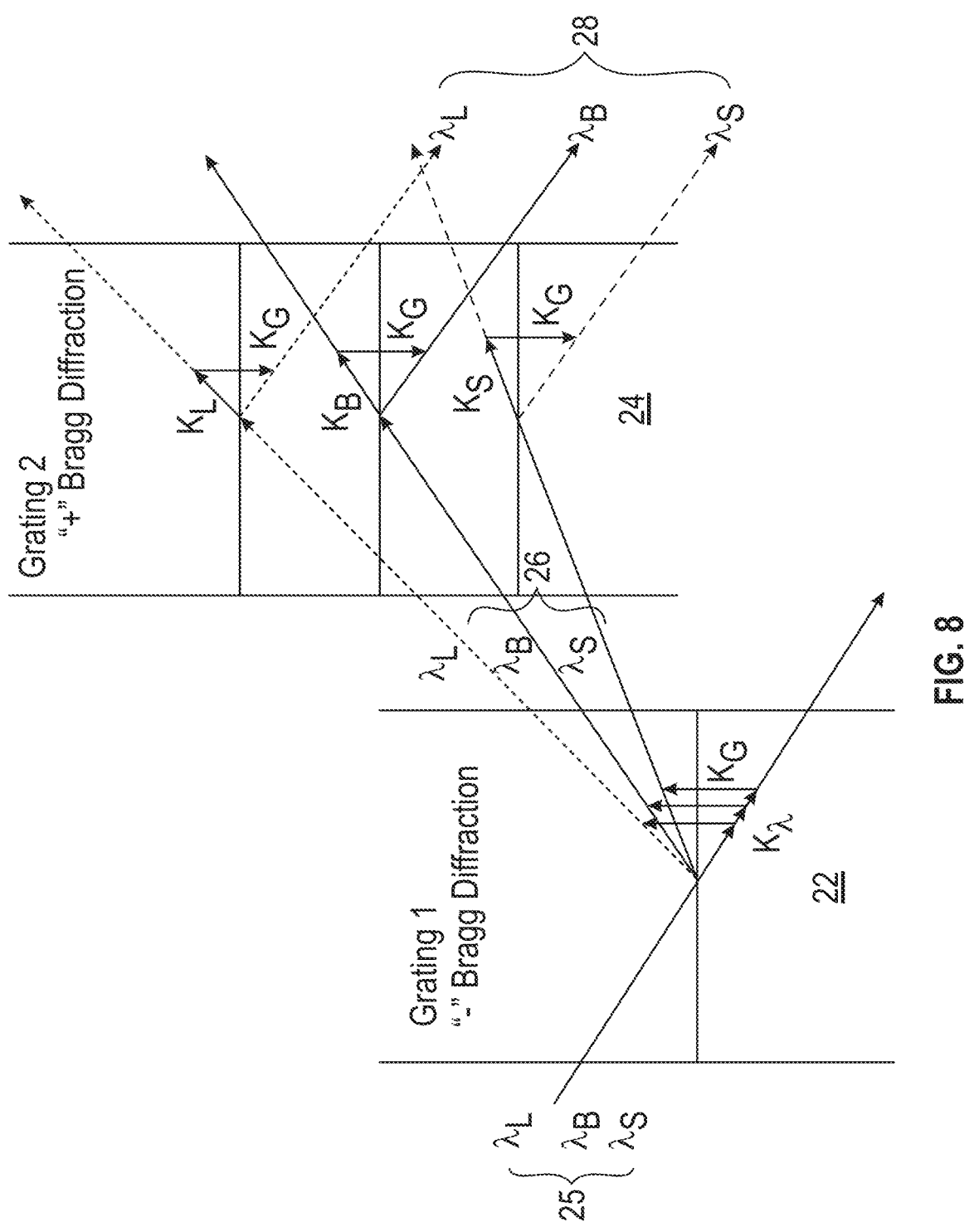

FIG. 8 illustrates ray tracing of multiwavelength plane wave diffraction at two sequential TVBGs of respective FIGS. 5 and 7.

Figure 9:
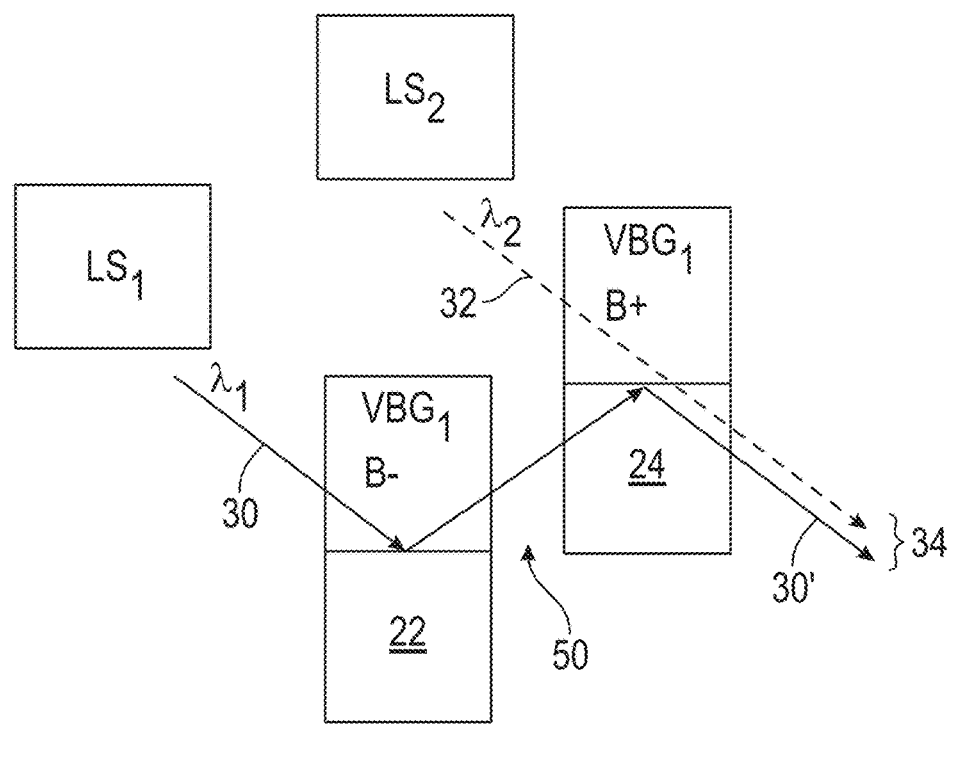

FIG. 9 illustrates one exemplary optical schematic configured to combine two broadband high-power beams into a single broadband high-power high-brightness collimated output beam in accordance with the inventive concept.

Figure 10:
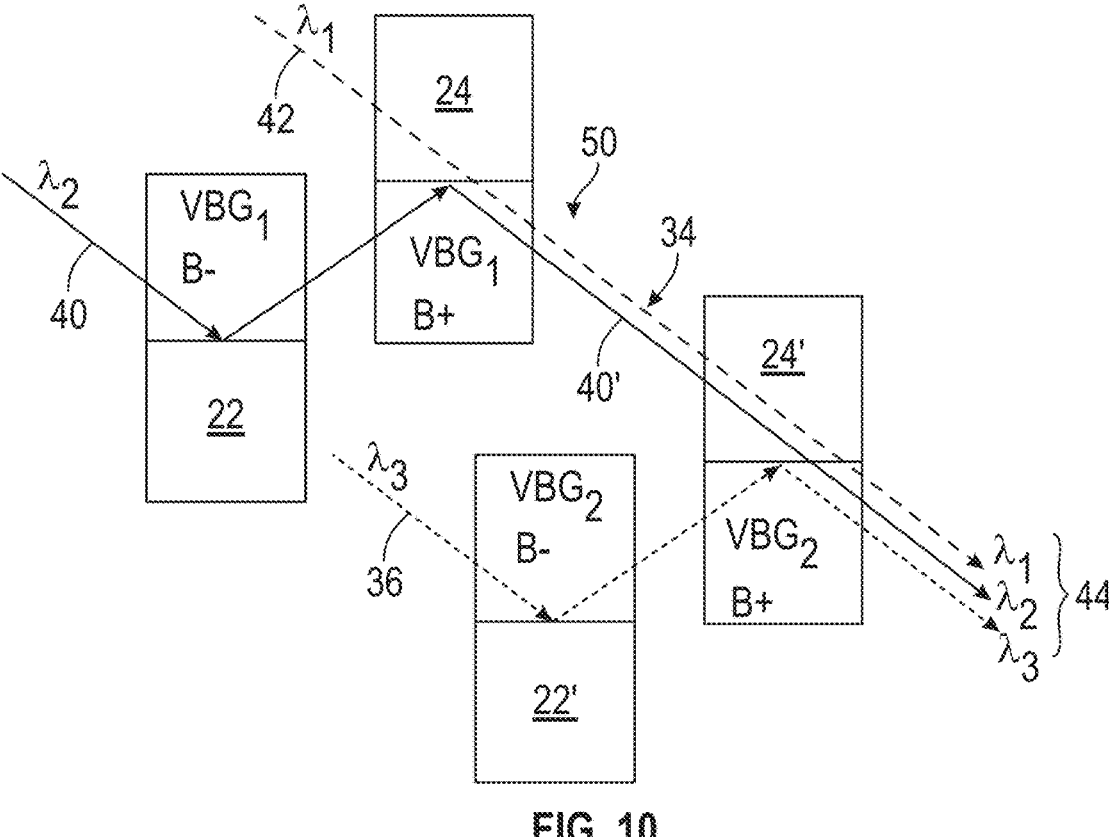

FIG. 10 illustrates another exemplary optical schematic configured to combine multiple broadband high-power beams into a single broadband high-power collimated output beam.

Figure 11:
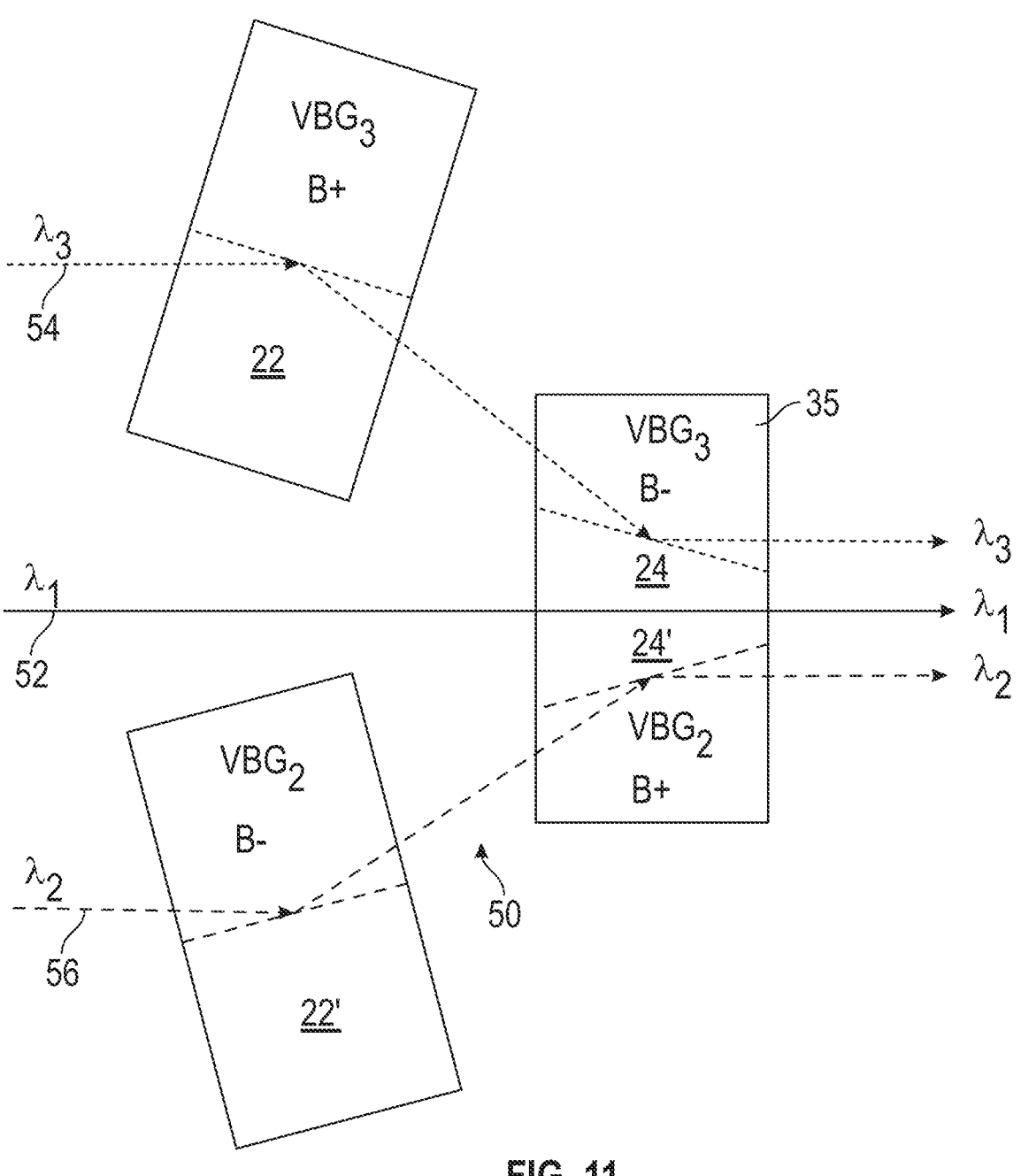

FIG. 11 illustrates still another exemplary optical schematic configured to combine multiple broadband high-power beams into a single broadband high-power collimated output beam with a multiplexed TVBG.

Figures 12A, 12B:
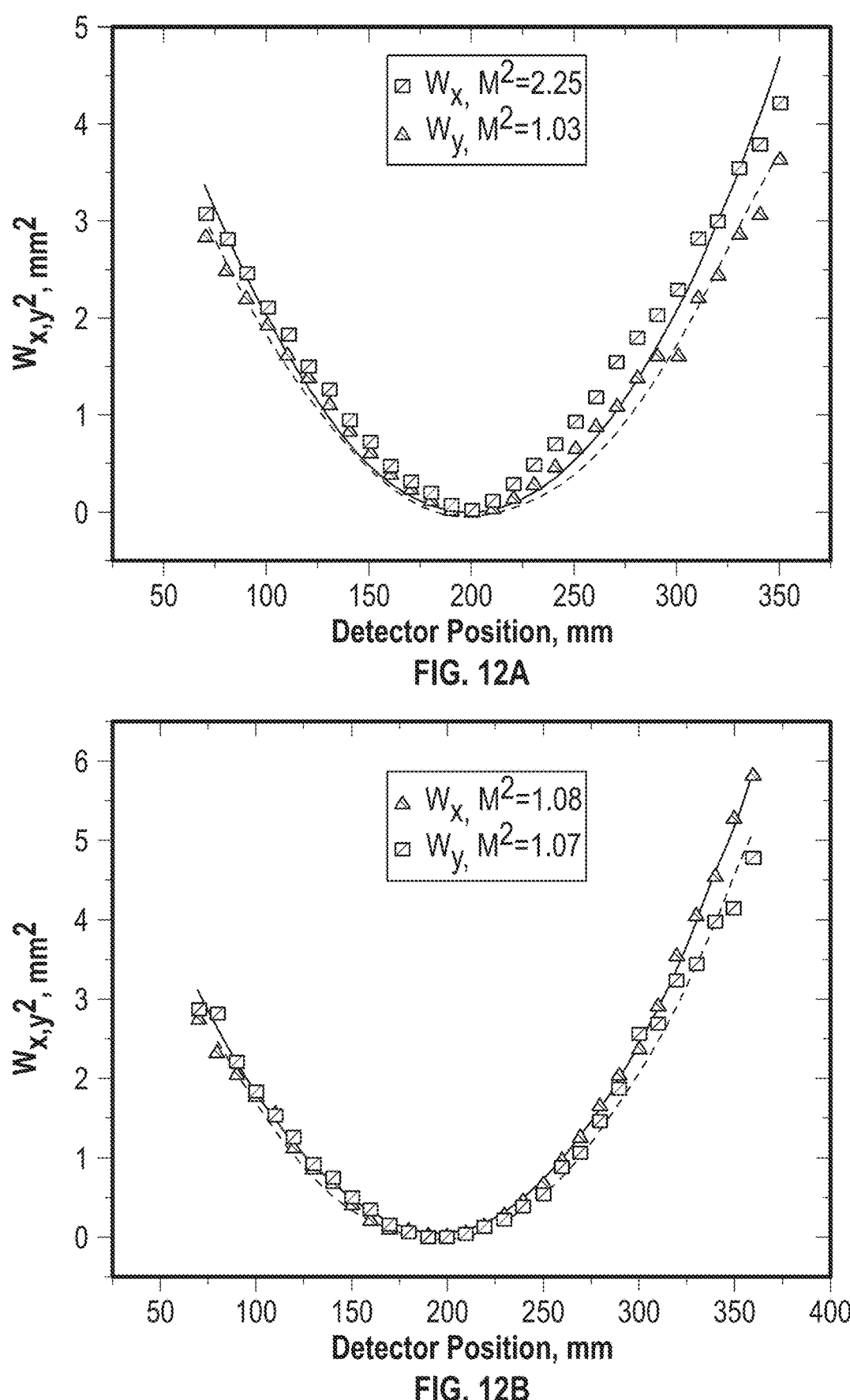

FIG. 12A illustrates experimentally obtained divergence of a superluminescent diode beam ($M^2$=1) after "+" Bragg diffraction at the first TVBG of FIG. 4 or 8.

FIG. 12B illustrates experimentally obtained divergence of a superluminescent diode beam ($M^2$=1) after sequential "+" Bragg diffraction at the first TVBG and "−" Bragg diffraction at the second TVBG of FIG. 4 or 8.

Figure 13:
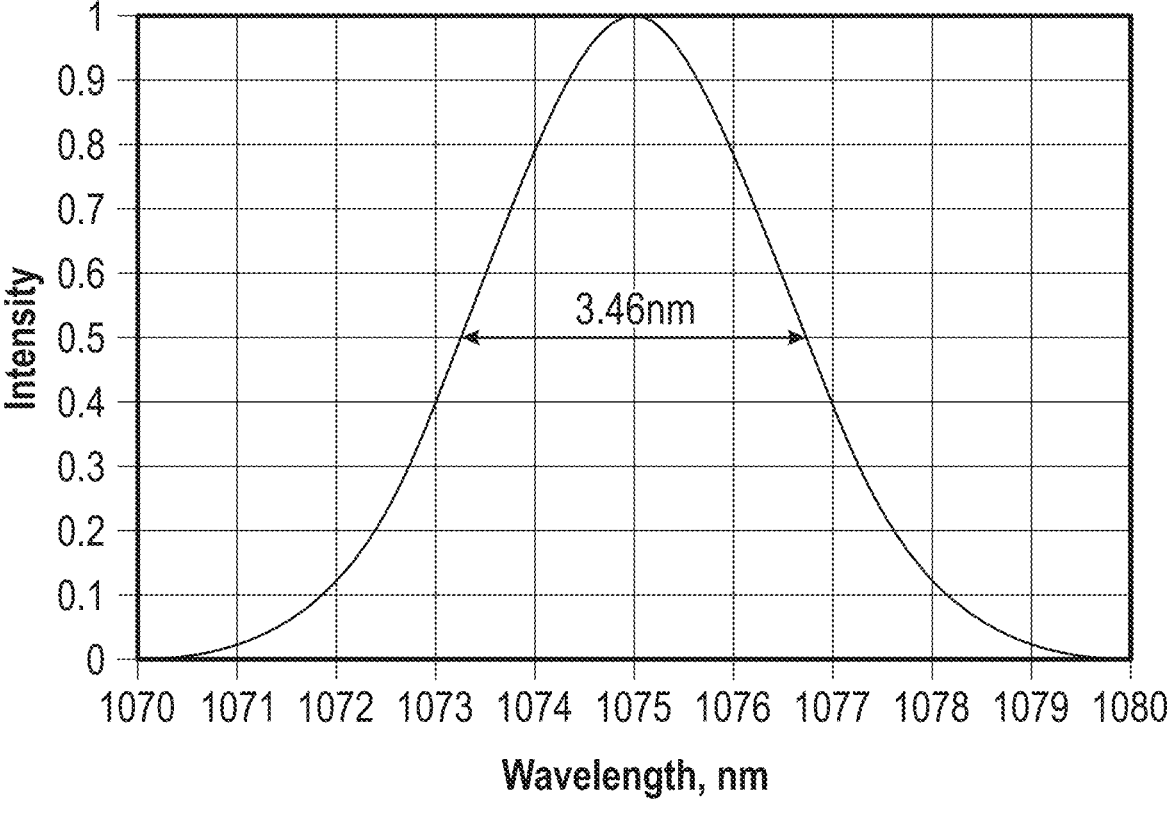

FIG. 13 illustrates the emission spectrum of a typical high power SM beam of an Yb-doped fiber laser modelled with Gaussian function.

Figure 14A:
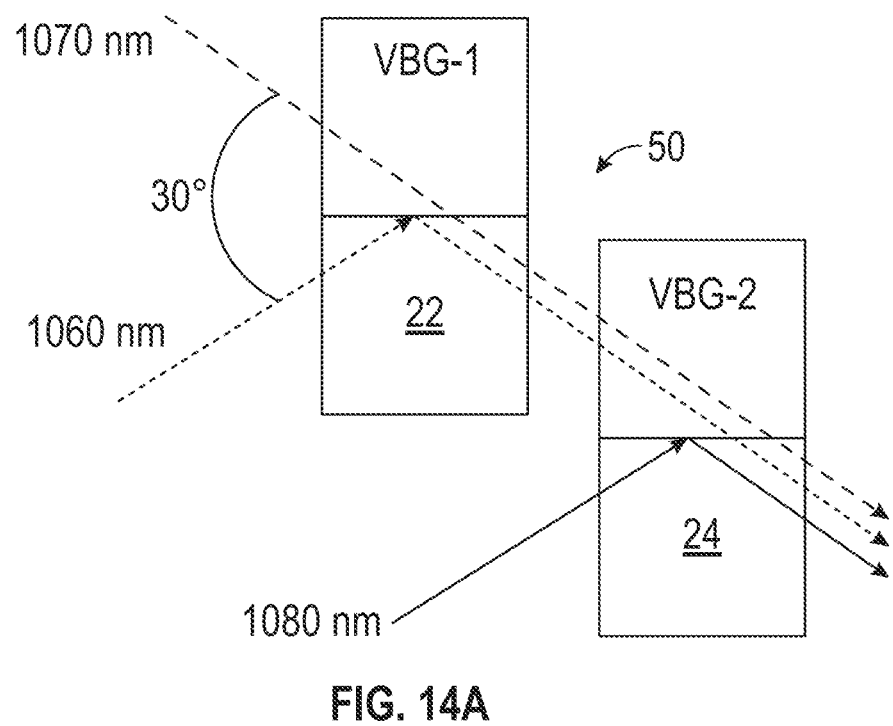

FIG. 14A illustrates the inventive beam combiner of FIGS. 4-10 configured to combine beams at respective 1060, 1070, and 1080 nm wavelengths.

Figure 14B:
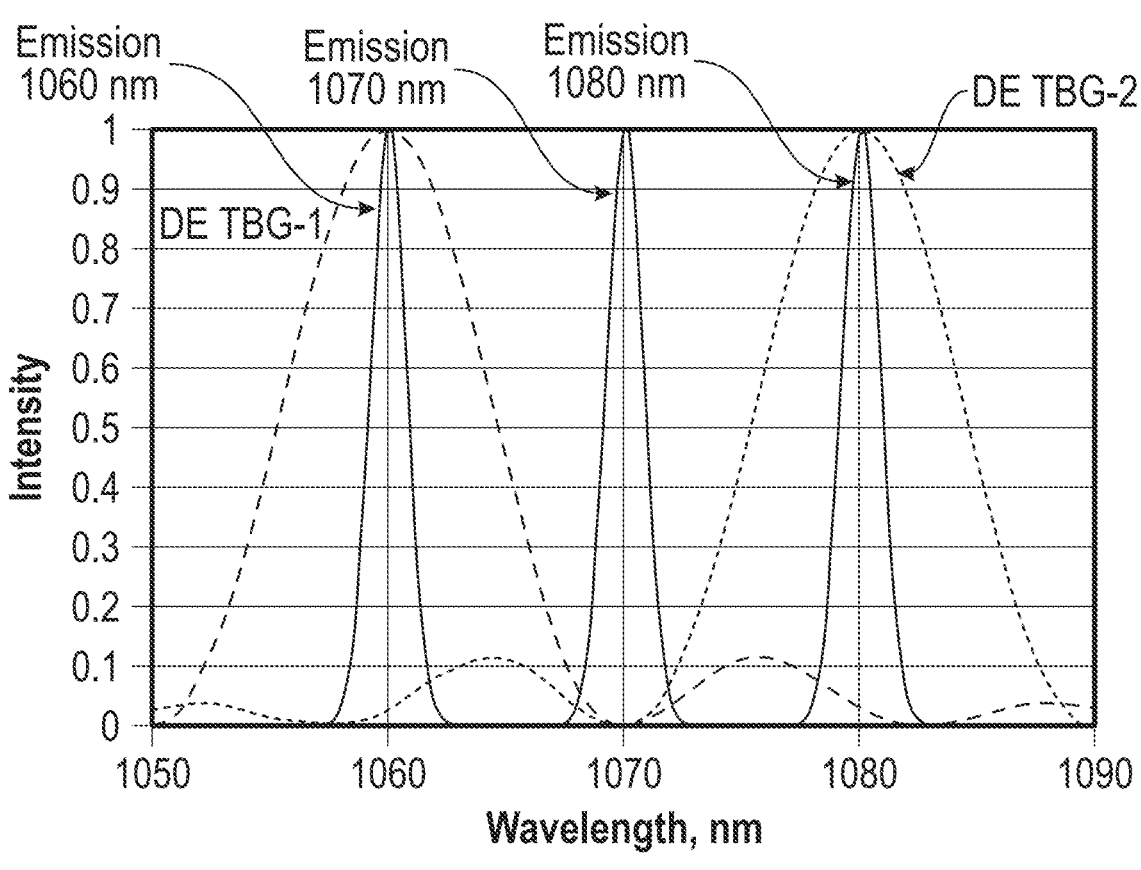

FIG. 14B illustrates emission spectra of three laser sources of FIG. 13 with different central wavelengths and diffraction efficiency spectra of respective upstream and downstream gratings of the inventive combiner of FIG. 14A.

Figures 14C, 15:
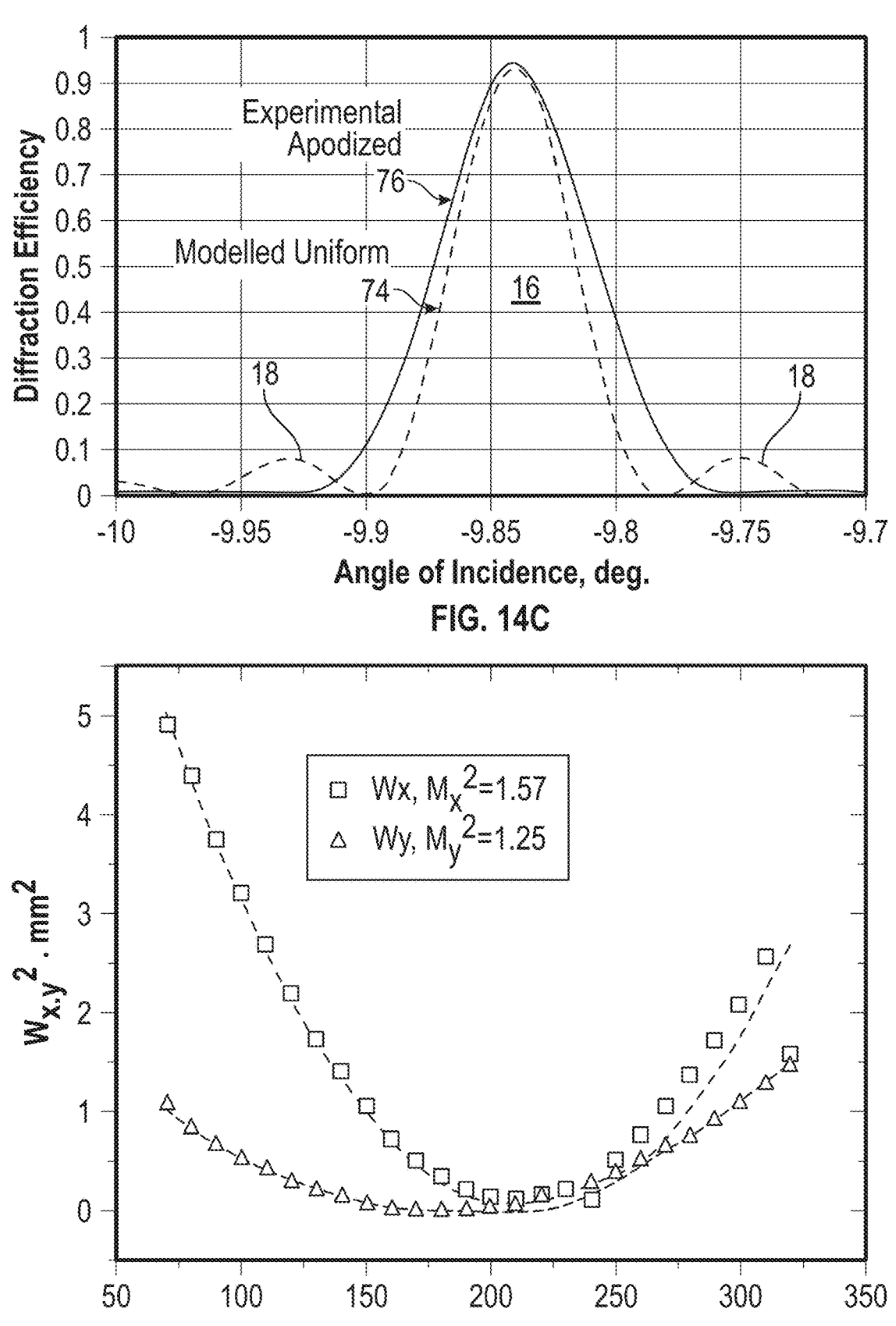

FIG. 14C illustrates the dependence of diffraction efficiency on incident angle for uniform and apodized TVBGs.

FIG. 15 illustrates the quality of 1 KW SM beam diffracted by the TVBG in the horizontal plane of diffraction ($M_x$) and in vertical plane ($M_y$).

Figure 16:
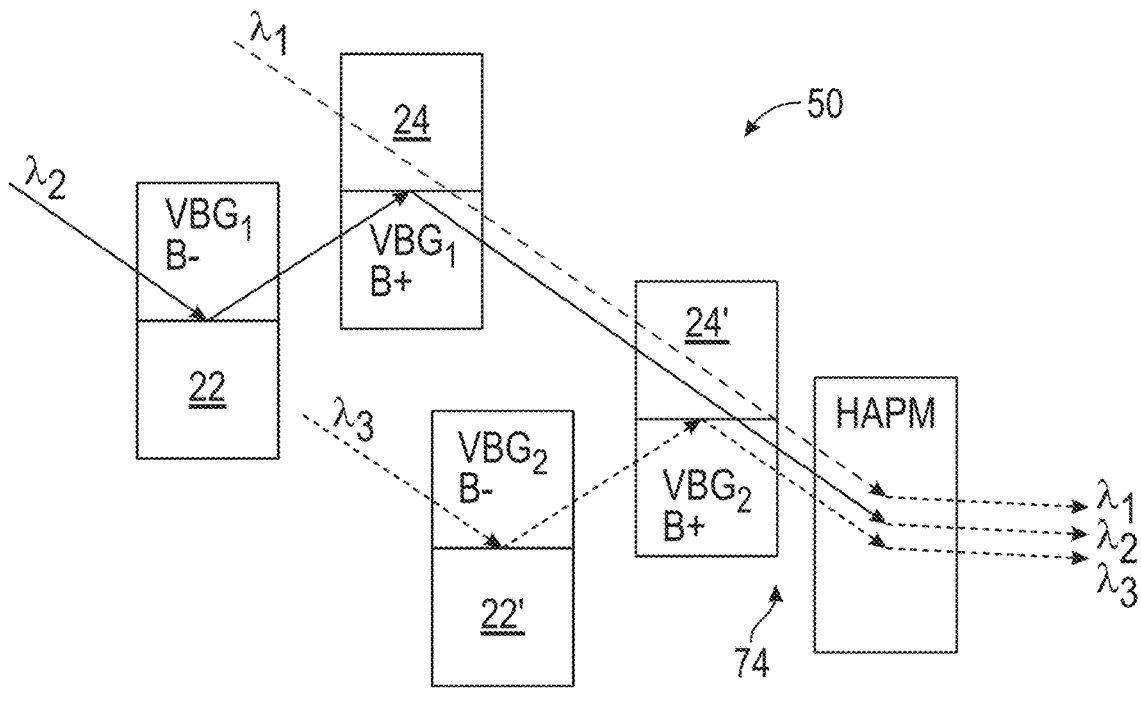

FIG. 16 illustrates the inventive combiner of FIGS. 4-12 and 14A configured with a holographic achromatic phase mask for compensating the undesirable effects of the thermal lens produced in combining TVBGs by high power broadband beams.

Figure 17:
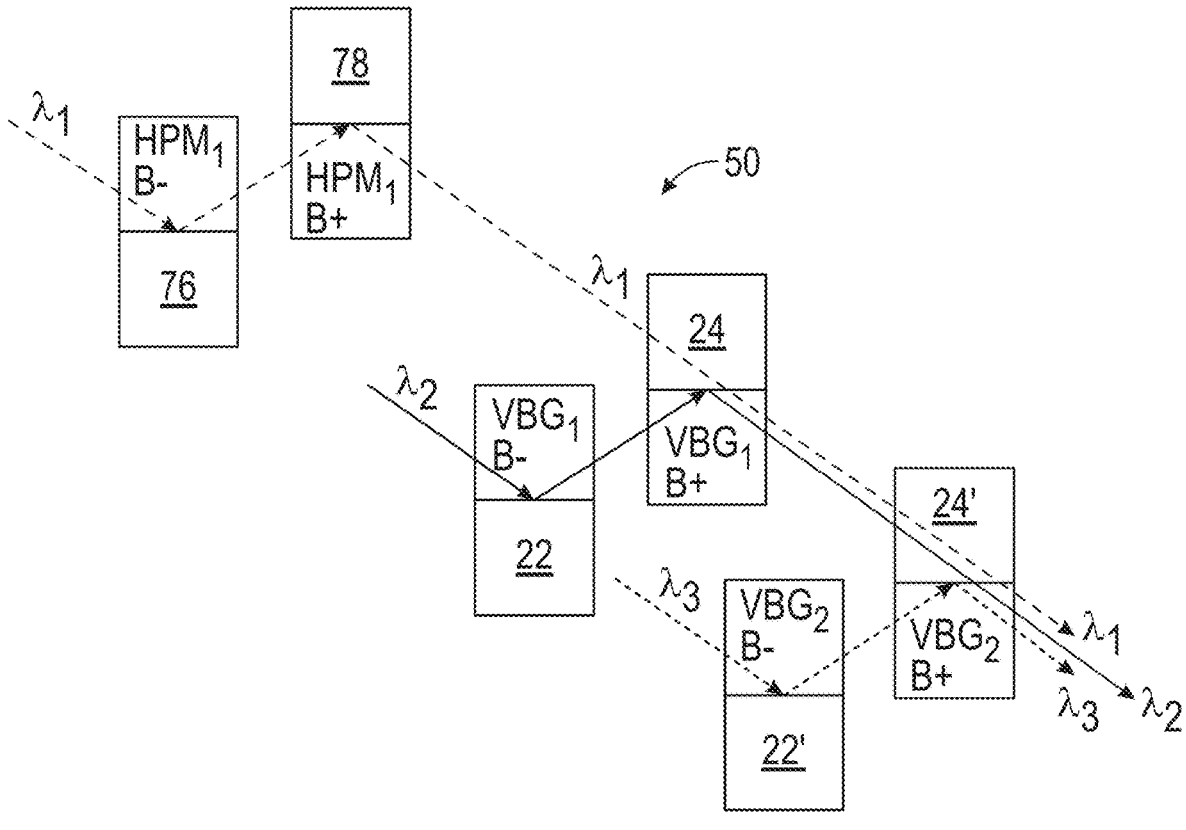

FIG. 17 illustrates the inventive combiner of FIGS. 4-12 and 14A configured with a holographic phase mask or masks for converting a Gaussian beam ($TEM_{00}$) to a collimated optical vortex for minimizing the deleterious effects of the induced thermal lens in a combining TVBG.

Figure 18:
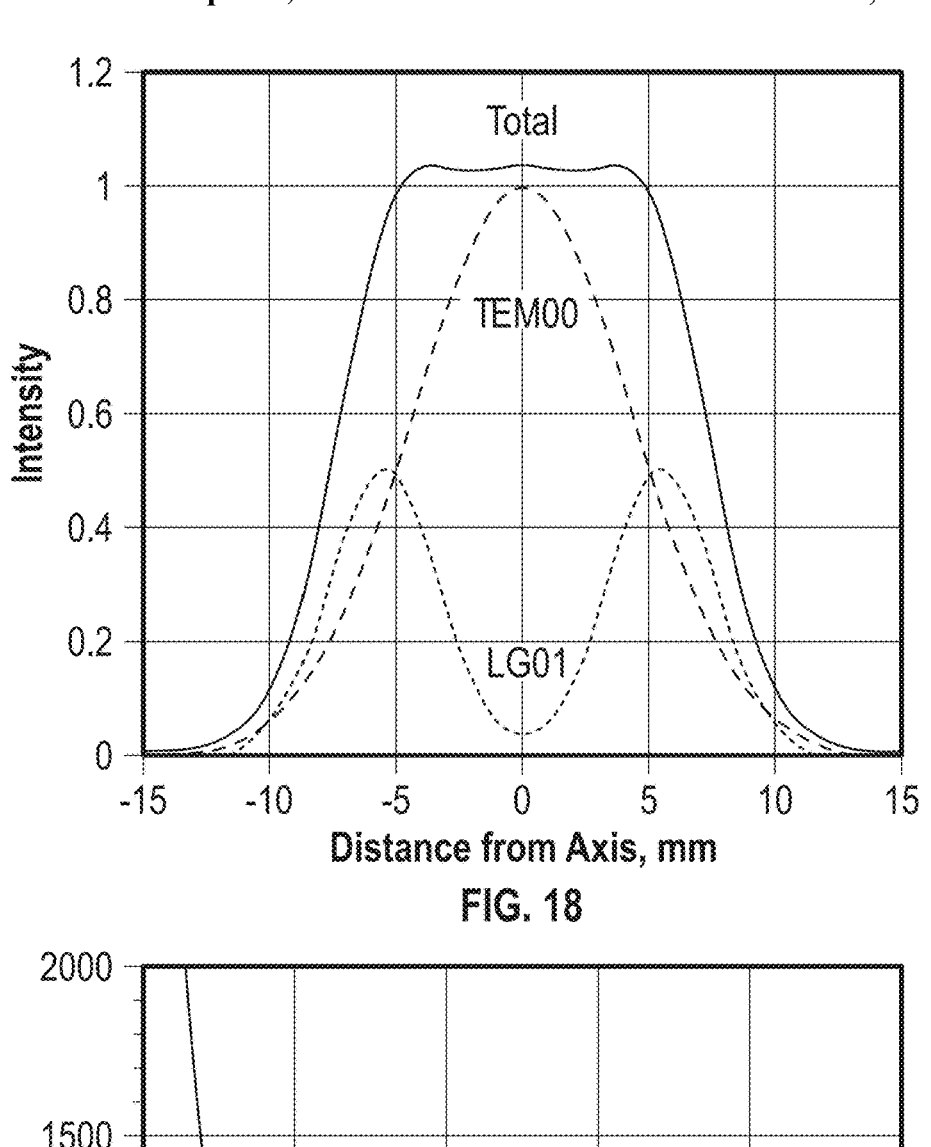

FIG. 18 illustrates radial intensity distribution profile in a combining TVBG multiplexing a diffracted Gaussian beam and a transmitted vortex beam.

Figure 19:
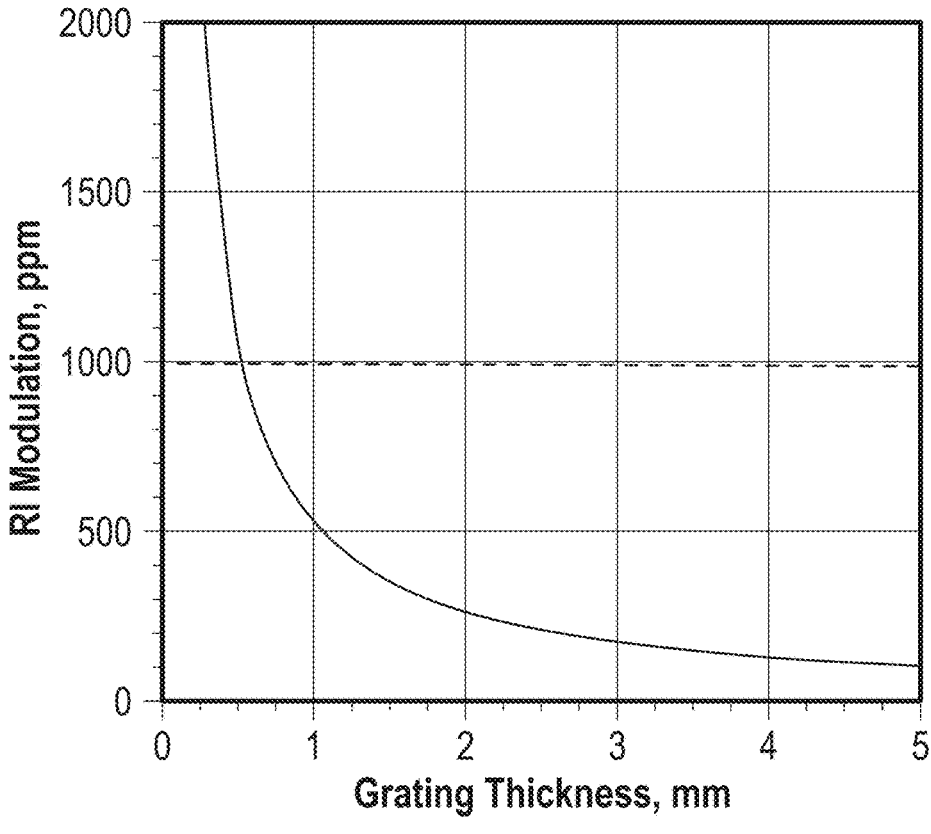

FIG. 19 illustrates the dependence of RIM required for 100% diffraction efficiency of a TVBG on the TVBG's thickness.

SPECIFIC DESCRIPTION

FIGS. 4-13 illustrate respective schematics addressing the angular dispersion—dependence of the diffraction angle on wavelength—and its role in spectral beam combining. The angular dispersion is an inherent characteristic of VBGs. Physically, the angular dispersion is responsible for the increased divergence of and thus decreased spectral brightness of a polychromatic beam diffracted in a VBG. When a VBG operates as a beam combiner multiplexing a plurality of broadband beams, the angular dispersion detrimentally affects the brightness of the combined beam. The broadband beams are typically associated with high power lasers including, for example, fiber lasers. Yet the disclosed subject matter is fully applicable to other types of lasers. Note that while SM lasers are of particular interest here, the inventive concept covers multimode (MM) lasers as well.

Referring specifically to FIG. 4, the inventive basic schematic for eliminating angular dispersion of VBGs includes two identical periodic "+" and "−" TVBGs 22, 24, respectively. The TVBGs are sequentially aligned along a light path to output a broadband beam 28 which is collimated, i.e., not fan-shaped. Note that output beam 28 propagates parallel to an input polychromatic beam 25 which is incident on upstream TVBG 22 at a positive Bragg angle.

The illustrated schematic operates in the following manner. The incident beam 25 is first diffracted upon coupling into upstream TVBG 22. The angular dispersion of TVBG 22 causes a fan of spectral components 26 at the output of the grating. As can be seen, the solid central Bragg wavelength is diffracted at the double Bragg angle, the long/dashed and short/dotted wavelengths (or spectral components) of fan-shaped beam 26 are output at respective different angles relative to the Bragg angle. The fan-shaped beam 26 is further incident on downstream TVBG 24 at a negative Bragg angle. Consequently, downstream TVBG 24 reverses the angles at which respective long and short wavelengths have been diffracted in upstream TVBG 22 and outputs collimated broadband beam 28. In other words, the effects of angular dispersion in respective TVBG 22, 24 cancel out each other. The width of collimated output beam 28 in a plane of diffraction is greater than that of incident beam 25 because in TVBGs different spectral components have different lateral displacement. However, the increased width does not notably affect the target since the light power density does not decrease in the far field of beam 28, as explained in detail below.

A more detailed explanation of the angular dispersion and a mechanism for compensating it are discussed in reference to FIGS. 5-8. In particular, FIGS. 5 and 7 illustrate ray tracing for diffraction of a multiwavelength plane wave in respective TVBGs 22 and 24 of FIG. 4. For simplicity, TVBGs 22, 24 each are a symmetric VBG where a grating vector ($K_G$) is perpendicular to the surface normal. The grating vector $K_G$ expresses the direction and period of the grating. As an artisan readily understands, the grating vector may not be perpendicular to the surface, but be inclined at an arbitrary angle. The angular dispersion phenomenon in VBGs in a way defies perhaps one of the most known laws—the law of reflection in accordance with which the angle of incidence equals the angle of reflection. In contrast, here while spectral components in the beam incident on a TVBG are all parallel to one another, they diverge at respective different angles providing the output beam with a fan-shaped form.

FIG. 5 illustrates ray tracing of diffraction at positive Bragg angle in upstream TVBG 22 for a resonant wavelength in Bragg condition ($\lambda_B$, $K_B$) selected from a 205-3500 nm wavelength range, for longer wavelength ($\lambda_L$, $K_L$), and for shorter wavelength ($\lambda_S$, $K_S$). $K_G$ is a grating vector. $\theta_i$—incident angle in air, $\theta_{im}$—incident angle in medium, $\theta_{d8}$—diffraction angle for a resonant wavelength in medium (Bragg angle), $\theta_{dL}$ and $\mathbf{6}_{dS}$—diffraction angles in medium for longer and shorter wavelength, $\theta_e$—exit angles in air, $\theta_{im}$—transmission angle in medium, $\theta_f$—transmission angle in air, A-A line is a plane of constant refractive index.

The positive Bragg diffraction is the diffraction where an angle between $K_G$ and $K_8$ is positive (counter clockwise). A diffraction angle is determined as a vector sum of a grating vector and a particular wave vector—fan-shape beam. For a symmetric VBG, incident and diffraction angles in medium for a Bragg wavelength (solid lines) are equal, i.e., $\theta_{im} = \theta_{dB}$. Therefore, the exit angle of diffracted central spectral component—Bragg wavelength—is equal to the incident one $\theta_i = \theta_{eB}$. For spectral components of incident beam 25 propagating in the same plane wave but detuned from the Bragg wavelength, symmetry is destroyed because of different lengths of wave vectors. Hence, for the detuned wavelengths (shorter $\lambda_S$ and longer $\lambda_L$) which is excited at a Bragg angle for wavelength $\lambda_B$, respective diffraction angles are not equal to the incident angle. Accordingly, a fan of spectral components of output beam 26 acquires a divergence in the plane of diffraction where direction of spectral components propagation sweeps in a negative direction (clockwise) while wavelength increases.

FIG. 6 illustrates the dependence of diffraction angle in TVBG 22, recorded with a 1$\mu$ period $\Lambda$, on wavelength. In the illustrated graph, the vertical axis is the deflection from the diffraction angle for a resonant wavelength 1075 nm ($\theta_{d,\lambda}$)−$\theta_{d,1075}$). As can be seen, detuning for a few nanometers results in a few milliradian deflection. For high quality laser beams with the diameter exceeding a few millimeters, diffraction-limited divergence is less than a milliradian. The graph clearly illustrates that angular dispersion of TVBGs, diffracting broadband SM laser beam 25 of FIG. 5, significantly increases the beam's divergence.

FIG. 7 illustrates ray tracing of diffraction at a negative downstream Bragg angle in TVBG 24. The mechanism illustrated in this figure is identical to that of FIG. 5. However, in contrast to FIG. 5, here polychromatic incident SM beam 25 acquires a divergence in the plane of diffraction where the direction of propagation of spectral components 26 sweeps in the positive direction (counter-clockwise) while wavelength increases.

FIG. 8 illustrates the inventive structure based on the combined teaching of above-disclosed FIGS. 5 and 7, respectively. It shows a multiwavelength plane wave diffracted by two sequential identical VBGs 22 and 24, respectively at corresponding negative and positive Bragg angles. The shown configuration eliminates angular dispersion forming thus collimated broadband beam 28. In the figure, for a resonant wavelength in Bragg condition, wavelength and grating vector are denoted $\lambda_B$ and $K_B$, for longer wavelength—$\lambda_L$ and $K_L$, for shorter wavelength—$\lambda_S$ and $K_S$ and $K_G$ is a grating vector.

As mentioned above, the inventive schematic causes a lateral walk-off (lateral spectral chirp) of spectral components in a twice-diffracted laser beam and ellipticity in near field. For a beam of 10 mm diameter and angular dispersion of 4 mrad, diameter increase after propagation for 50 mm would be 0.2 mm. This effect causes a small decrease of power density of the beam in near field while does not change power density in far field. Hence, the brightness remains unchanged.

FIG. 9 illustrates a basic schematic of the inventive two-beam combiner 50 based on the teaching of FIGS. 5-8. The combiner 50 spectrally combines two broadband beams 30, 32 at respective central wavelengths of $\lambda_1$ and $\lambda_2$, which are emitted by respective high power laser sources $LS_1$ and $LS_2$, into a collimated combined beam 34. The schematic includes two identical and sequentially positioned upstream and downstream gratings $TVBG_1$ B– (22) and $TVBG_1$ B+ (24) respectively. The beam 30 is incident on upstream $TVBG_1$ 22 at a Bragg angle such that it acquires divergence in the plane of diffraction and exits TVBG 22 as a fan-shaped beam of $\lambda_1$ spectral components. The fan of $\lambda_1$ spectral components is further launched on downstream $TVBG_1$ B+24 which diffracts them in the opposite angular directions canceling out the angular dispersion which beam 30 acquires in upstream $TVBG_1$ B– 22.

The other beam 32 has spectral components $\lambda_2$ and is incident at "–" Bragg angle for $\lambda_1$, while $\lambda_2$ is detuned to one of zeros in the diffraction spectrum shown in FIG. 1A. Therefore, beam 32 passes through the grating without diffraction.

FIG. 9, like all other similar figures, shows diffracted and transmitted beams 30, 32 respectively with a lateral shift. However, both beams completely overlap in both near and far fields. While combined output beam 34 (30+32) is characterized by a decreased spectral brightness, the spatial brightness is doubled.

FIG. 10 shows three-beam combiner 50 including multiple TVBGs 22, 24, 22' and 24.' The TVBGs are arranged in respective pairs. One pair includes upstream "–" and downstream "+" TVBGs 22 and 24, respectively, whereas TVBG B– 22' and TVBG B+ 24' define the other pair.

In particular, beam combiner 50 spectrally combines three broadband beams 42, 40 and 36 centered at respective $\lambda_1$, $\lambda_2$ and $\lambda_3$ wavelengths. The upstream and downstream TVBGs 22 and 24 respectively operate identically to those of FIG. 9 and diffract components centered at $\lambda_2$ of beam 40 twice so as to cancel out the angular dispersion affecting beam 40 in each of TVBGs 22, 24. Accordingly, twice-diffracted output beam 40' is collimated and propagates downstream from TVBG 24 at the same angle as the incident angle of beam 40. The beam 42 has spectral components centered at hi that corresponds to one of zeros in a diffraction spectrum of the VBG in FIG. 1A and thus propagates through TVBG 24 without distortion. The beams 42 and 40' overlap each other in both near and far optical fields defining together a first broadband high power collimated output beam 34 consisting of $\lambda_1$ and $\lambda_2$ wavelengths.

The other pair of identical TVBGs 22', 24' respectively also operates in accordance with the basic schematic of FIG. 9. The third beam 36 centered at $\lambda_3$ impinges on upstream TVBG 22' at a negative Bragg angle. The once-diffracted fan-shaped beam 36 undergoes another diffraction in downstream (+) TVBG 24'. The latter combines twice-diffracted collimated beam 36' at $\lambda_3$ and broadband collimated beam 34 at $\lambda_1$ and $\lambda_2$ into a high—brightness and high-power broadband collimated output beam 44. The TVBGs 22, 24 of the first pair and TVBGs 22', 24' of the second pair may be all identical to one another. Alternatively, the TVBGs of the second pair may differ from those of the first pair. For example, the TVBGs of the second pair may be slightly angled relative to the TVBGs of the first pair or have different periods compared to those of the first pair.

It is clear from the schematic of FIG. 10 that the number of combined channels —broadband beams—is unlimited. Eventually, all beams overlap in both near and far fields. The limitation on the number of channels is determined by a total width of lasing medium gain spectrum compared to a spectral width of an individual laser.

FIG. 11 illustrates yet another schematics of beam combiner 50 operating in accordance with the inventive principles explained, for example, in regard to FIG. 9. However, in contrast to FIG. 9 (and FIG. 10), this schematic includes an odd number of PTR glass plates. This is because a single PTR glass plate can host multiple gratings. Accordingly, the shown schematic includes two upstream TVBGs 22 and 22' each recorded in the dedicated PTR plate. However, downstream TVBGs 24 and 24', which are paired with respective upstream TVBGs 22 and 22', share the same PTR glass plate 35.

The upstream $TVBG_2$ 22 and $TVBG_3$ 22' diffract respective broadband beams 54, 56 including respective groups of spectral components centered at $\lambda_3$ and $\lambda_2$. Once diffracted, respective fans of spectral components centered at $\lambda_3$ and $\lambda_2$ impinge on downstream PTR plate 35. The downstream TBVGs 24 and 24' recorded in PTR plate 35 provide diffraction at Bragg angles opposite to those of respective upstream gratings 22 and 22'. As a result, collimated beams at $\lambda_3$ and $\lambda_2$, respectively are overlapped in near and far fields. A third broadband beam 52 at $\lambda_1$ propagates through multiplexed hologram 35 without distortion and overlaps twice-diffracted beams 54, 56 in the near and far fields. As the PTR glass can host more than two gratings, a number of channels combined by a single multiplexed TVBG could be increased in accordance with the thickness and refractive index modulation in a glass plate. Similar to the above-disclosed schematics, the number of groups that include upstream and multiplexed TVBGs is not limited to one shown in FIG. 11 and could be increased.

FIGS. 12A and 12B illustrate experimental data confirming the ability of the pair of spatially uniform TVBGs (FIGS. 4 and 8) to compensate the angular dispersion of the TVBGs. The data was obtained using a SM superluminescent diode outputting a collimated beam with a quality parameter $M^2=1$ (the highest quality) which propagated through sequentially positioned (+) upstream and (–) downstream TVBGs of the inventive structures, as it shown in FIGS. 4 and 8. The TVBGs each has a period A of 2.47 μm and thickness of 1.5 mm.

Referring specifically to FIG. 12A, upon diffracting the incident beam in XZ plane by the upstream "+" TVBG, beam quality worsened to $M_y^2=1.03$ and $M_x^2=2.25$. As can be seen, the divergence of the diffracted beam insignificantly increased in the Y-direction due to the grating's defects. However, in the plane of diffraction (X-direction), the diffracted beam exhibited markedly greater divergence detrimentally affecting the beam's quality. The reason for such a deterioration in the X direction is a result of angular dispersion of the TVBG.

FIG. 12B illustrates the effect the downstream "–" TVBG had on the once diffracted beam. In particular, upon diffraction at the "–" Bragg angle, the twice diffracted beam, such as a single mode (SM) ytterbium (Yb) beam, had $M_y^2=1.07$ and $M_x^2=1.08$ which, as one of ordinary skill readily realizes, indicate that this beam is of high quality.

The second problem associated with TVBGs stems from the leakage of radiation between channels, i.e., partial diffraction of a transmitted beam. As discussed above, the spectral width of TVBG must be wide enough to diffract a broadband beam, such as one shown in FIG. 13. In particular, the latter illustrates the emission spectrum of the output of a rather typical high power SM Yb fiber laser. The leakage occurs when side lobes 18 of FIG. 1A, flanking main lobe 16 of maximum diffraction efficiency, spectrally spread and diffract adjacent beams that should be transmitted.

FIGS. 14A-14B provide the illustration of the leakage mechanism in inventive combiner 50 multiplexing three channels at respective 1060, 1070 nm and 1080 nm wavelengths. This problem is connected to specific spectra of TVBGs. Therefore, upstream gratings that provide initial angular fan of the beams (FIG. 10) are not shown for simplicity. The first downstream TVBG 22 diffracts the 1060 nm channel and transmits the 1070 channel which merge into a first collimated combined beam at 1060 and 1070 nm. The latter is incident on the second downstream TVBG 24 which transmits the first combined beam and diffracts the 1080 nm channel such that all three beam are combined in a total combined collimated beam. As shown above, combiner 50 with upstream TVBGs minimizes the angular dispersion due to the inventive structure. But the angular dispersion is not the only phenomenon observed in the shown structure, as explained below.

FIG. 14B illustrates diffraction efficiency spectra of gratings 22 and 24 of FIG. 14A. Specifically, the gratings are recorded with a 2.05 μm period and thickness of 2.37 mm in PTR glass. The solid curves are emission spectra of respective SM Yb lasers with spectral width of 3.4 nm (FWHM). The gratings have respective wide spectra to provide the efficient diffraction of respective beams at 1060 and 1080 nm. In other words, the 1060 and 1080 channels each are placed at the maximum diffraction efficiency of the spectrum of a corresponding grating. To avoid unnecessary crosstalk between channels at 1060 and 1070 nm and channels 1080 nm and 1070 nm, the 1070 nm channel is placed to the first zero in the diffraction spectrum of each grating 22 or 24. However, as mentioned above, due to the nature of VBGs, the spectrum of each grating also has a group of side lobes that spread into areas of other channels. Thus, both gratings 22, 24 respectively transmit the 1070 nm channel with some losses caused by low-efficiency diffraction at the wings of the central lobe and side lobes. Additionally, combining TVBG 24 of FIG. 14A diffracts a portion of respective 1060 nm channel, which it should not, as the first combined beam propagates through this TVBG. The same result—undesirable diffraction of transmitted channels—would be obtained if the relative position of gratings 22 and 24 were reversed. In this case, TVBG 22 would be a downstream combining grating affecting the 1080 and 1070 nm channels combined into the first output beam in upstream grating 24. Based on the foregoing, it is necessary to suppress side lobes of the spectrum of each grating 22, 24.

FIG. 14C shows the suppression of side lobes 18 of FIG. 1A in a single TVBG, such as downstream TVBG 24 of FIGS. 4-11, by using an apodization technique known to one of ordinary skill. In general, the term apodization means gradual change of RIM in the direction of beam propagation that results in eliminating the unfavorable features of the spectrum, such as side lobes 18. Here, the apodization includes forming a specific profile of RIM in direction perpendicular to grating vector $K_G$ of FIGS. 5, 7 and 8. In particular, the apodization technique used here includes gradually erasing RIM by exposing the surface layers of the PTR glass plate to a short wavelength UV radiation. The results shown in FIG. 14C were obtained using a 4 mm thick TVBG with a period Λ of 3 μm and gradual erasing of RIM in 0.5 mm thick surface layers. Compared to uniform TVBG 74, apodized TVBG 76 provides a significant suppression of side lobes 18. A thorough optimization of the apodization profile can practically completely suppress side lobes 16 which allows for the decreased spectral distance between adjacent channels. Compared to the uniform inventive TVBG that combines no more than 4 broadband beams/channels, the inventive apodized TVBG can combine 5-6 channels significantly increasing the total multi-kW output power.

The third problem dealt with by this invention is the thermal lensing effect induced by heat which is a result of absorption of high-power broadband beams in the inventive combiner. One of deleterious effects of the thermal lens is its detrimental influence on the parallelism and the beam quality of a beam passing through a TVBG. The absorption of laser emission in a 1 μm wavelength range is about $10^{-4}$ $cm^{-1}$ ($\approx 250$ ppm/cm). It has a thermo-optic coefficient dn/dT<1 ppm/K and coefficient of thermal expansion CTE=9.5 ppm/K. Therefore, the thermal lens in PTR glass holographic elements is so small that it is of no concern for power densities below 1 kW/cm².

In contrast to low power densities, higher power densities significantly affect the beam quality. For example, 1 kW SM fiber outputs a 6 mm beam with a beam quality parameter $M^2=1.1$ which is incident on a TVBG at the Bragg angle. The grating, configured with a period Λ 1.17 μm, thickness 1 mm, and aperture 25×25 mm², diffracts the beam with the average power density of about 3.5 kW/cm².

FIG. 15 illustrates the beam quality of the diffracted beam obtained during experiments with the above-disclosed 1 kW fiber laser. As can be seen, the $M^2$ of the diffracted beam in the vertical direction "y", represented by squares, deteriorates to $M^2=1.25$ due to the thermal lensing effect. However, the beam quality lowers sharply in the horizontal direction "x" to an $M^2=1.57$ due to a cumulative effect of angular dispersion and thermal lensing. The inventive combiner includes a few structural additions to the above-disclosed main structure which solve this problem.

One of the structural additions includes using a phase mask. Yet in contrast to monochromatic phase masks that cannot operate with broadband beams, the inventive combiner utilizes a holographic achromatic phase mask (HAPM) that corrects the thermal distortions accumulated in a beam combiner. The thermal lens, induced in the recorded in the PTR glass with the recorded TVBG of the inventive combiner by high power beams with Gaussian intensity profile, is usually a concave lens with a complex shape. Accordingly, to minimize the induced divergence, this beam passes through a negative lens with a complex shape which substantially compensates the spectral aberrations caused by the positive thermal lens. Thus, the HAPM provides the optical effect which is opposite to the effect by the induced thermal lens and therefore compensates for the thermal lens induced in the combining TVBGs. Accordingly, the inventive combiner provided with the HAPM outputs the combined beam with a substantially higher quality and therefore greater brightness than the beam combined in the inventive combiner without it. The HAPM used in this invention is disclosed in detail in a co-pending patent application PCT/US21/16588 which together with the subject matter application is commonly owned and incorporated herein in its entirety by reference.

FIG. 16 illustrates an example of inventive combiner 50 of FIG. 4-11 incorporating the above-discussed HAPM such as a hologram of a complex conventional or Fresnel lens. A first pair of upstream and downstream TVBG, 22, 24 are aligned at respective "−" and "+" Bragg angles. The downstream $TVBG_1$ 24 transmits a broadband high power beam of spectral components centered at $\lambda_1$ wavelength. The upstream $TVBG_1$ 22 and downstream $TVBG_1$ 24 diffract another high power beam with spectral components $\lambda_2$ wavelength so that the combined collimated beam at $\lambda_2$ wavelength and transmitted beam at $\lambda_1$ constitute a first combined beam. A second pair of identical upstream 22' and downstream 24' $TVBGS_2$ diffract a group of spectral components $\lambda_3$ twice. The combining downstream TVBG 24₂' transmits the first combined beam and output a total combined beam at $\lambda_1$, $\lambda_2$ and $\lambda_3$. The power density radial gradient in the combined beam induces a thermal lens which increases the beam divergence. To improve the brightness of the total combined beam, the latter is guided through a HAPM 74 configured to compensate the effect of the thermal lens in TVBG 24'. The other HAPM 74 can be located between TVBGs 24 and 24' respectively to increase brightness of the first combined beam. Alternatively, HAPM 74 may be written within the same PTR glass as TVBG 24'.

FIGS. 17 and 18 illustrate inventive beam combiner 50 provided with another structural solution for compensating thermal lensing. The added structure minimizes the impact of the thermal lens on the combined beam's brightness by incorporating a holographic phase mask (HPM). The latter alters the transmitted beam's intensity profile and converts it to a donut-shaped profile. As a result, the merger of the donut-shaped and Gaussian beams results in a flattop combined beam.

Referring specifically to FIG. 17, combiner 50, realizing the above-discussed concept, combines, for example, three broadband beams having respective groups of spectral components $\lambda_1$, $\lambda_2$ and $\lambda_3$. The upstream pair of "−" and "+" HPMs 76, 78 respectively, sequentially diffract the $\lambda_1$ spectral components of the first broadband Gaussian beam such that the Gaussian beam ($TEM_{00}$) with $\lambda_1$ spectral components is converted to a collimated optical vortex beam, e.g. Laguerre-Gaussian beam ($LG_{01}$) generally having a donut shape better seen in FIG. 18. The latter has rotational symmetry along its propagation axis and thus carries an intrinsic rotational orbital angular momentum affecting anything along the beam's path. The downstream TVBGs 24 and 24' of respective pairs of TVBGs 22, 24 and 22', 24', which eliminate angular dispersion of the gratings in accordance with the main inventive concept, transmit the $LG_{01}$ beam. The latter sequentially merges with each of diffracted beams of $\lambda_2$ and $\lambda_3$ spectral components in respective downstream TVBGs 24, 24' and minimizes the effect of the thermal lens within each of these gratings. The beam-converting system of HPMs 76, 78 may include additional HPMs if necessary, which may be the case with the increased number of TVBG pairs.

FIG. 18 illustrates the result obtained using the above-disclosed structure of FIG. 17. As can be seen, the merger of the donut-shaped $LG_{01}$ and diffracted Gaussian beam $TEM_{00}$ results in the total beam with a flattop intensity profile.

FIG. 19 illustrates still another structural consideration which includes configuring a TVBG with the smallest possible thickness. This approach provides the smallest absorption of radiation, smallest heat generation, fastest thermal conductivity to surfaces, and smallest optical path, and therefore, largest focal length of the thermal lens. The determination of the optimal thickness is based on dependence of the grating's efficiency on refractive index modulation (RIM) and thickness.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. References in the singular or plural form are not intended to limit the presently disclosed systems or methods, their components, acts, or elements. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, one of ordinary skill in the art readily appreciates that various alterations, modifications, and improvements will readily occur to those skilled in the art. For instance, examples disclosed herein are applicable in other contexts. Such alterations, modifications, and improvements are part of this disclosure. Accordingly, the foregoing description and drawings are by way of example only.

What is claimed is:

1. A spectral beam combiner comprising;
at least one pair of a first transmitting volume Bragg grating (TVBG) and a second TVBG spaced apart along a light path, the first TVBG being aligned at one of "+" and "−" Brsgg angles, and the second TVBG being aligned a her one of the "30 " and "−" Bragg angles, which is opposite to the one Bragg angle, wherein the first TVBG and the second TVBC provide sequential diffraction of a first roadband beam which is incident on the first TVBG at a first central wavelength satisfying the Bragg condition,
the first TVBG and the second TVBG being configured identically to one another so that dispersions of the first TVBG and the second TVBG, respectively compensat one anothe to eliminate gence of the sequentially diffracted first broadband beam in a plane of diffraction, and
the second TVBO transmitting a second broadband beam at a second central wavelength which does not satisfy the Bragg condition, the second beam being launched her th opposite Bragg angle, so that the sequentially diffracted first broadband beam and the transmitted second broadband beam merge into a single high-power collimated broadband output beam.

2. The spectral beam combiner of claim 1 further comprising at least one additional pair of first and second TVBGs which are configured identically to one another and aligned at respective opposite Bragg angles to provide sequential diffraction of a third polychromatic broadband beam at a central wavelength which satisfies the Bragg condition and is different from the first central wavelength, wherein the second TVBG of the additional pair transmits the single high-power collimated broadband beam which merges with the third sequentially diffracted beam into a total combined collimated broadband output.

3. The spectral beam combiner of claim 2, wherein the first TVBG and second TVBG of the second pair are configured identically to or different from the first TVBG and the second TVBG of the first pair.

4. The spectral beam combiner of claim 2 further comprising at least one second additional pair of a first TVBG and a second TVBG, the first TVBG and the second TVBG of the second additional second-pair being aligned at respective opposite Bragg angles to provide a sequential diffraction of additional broadband first beam at a central wavelengths that satisfies the Bragg condition,
  wherein the second TVBG of the second additional pair transmits the total combined collimated broadband beams so that the sequentially diffracted additional broadband first beam merges with the total combined collimated broadband beams into a subsequent total combined collimated broadband output.

5. The spectral beam combiner of claim 1, wherein the first TVBO and the second TVBG are recorded in respective photo-thermo-refractive glass plates.

6. The spectral beam combiner of claim 2, wherein the first TVBGs of each of the first and second pairs is recorded in a photo-thermo-refractive glass plate, whereas the second TVBG of each of the first and second respective pairs is recorded in a single multiplexing PTR glass plate.

7. The spectral beam combiner of claim 1 further comprising a compens tor which is configured to compensate for a thermal lens induced in one of the first TVBG and the second TVBG, or both the first TVBG and the second TVBG of the at least one pair by the first broadband beam and the second broadband beam.

8. The spectral beam combiner of claim 7, wherein the compensato includes a holographic achromatic broadband phase mask (HAPM) recorded in a hoto-thermo-refractive glass plate which is located downstream om th second TVBG of the at least one pair or recorded in the PTR glass with the second TVBG of the at least one pair.

9. The spectral beam combiner of claim 7, compensator includes a pair of holographic phase masks (HPMa) which are aligned at respective opposite angles upstream from the at least one pair of the first TVBG and the secomd TBVG, the HPM diffracting the second broadband beam, which is then transmitted by the second TVBG of the at least one pair, while converting a Gaussian intensity profile of the second broadband beam to a donut-shaped intensity profile.

10. The spectral beam combiner of claim 9, wherein the second broadband beam with the donut-shaped intensity profile merges with the first sequentially diffracted b m into t e single high-power collimated broadband output beam with a flattop intensity profile.

11. The spectral beam combiner of claim 1, wherein e first TVBG and the second TVBG each have a thickness of at most 1 mm and refractive index modulation (RIM) of about 1000 ppm to provide a 100% diffraction efficiency at a wavelength of the sequentially diffracted first broadband beam in a 1 $\mu$m range.

12. The spectral beam combiner of claim 1, wherein both the first TVBG and the second TVBG of the one pair are apodized to minimize leakage between difracted and transmitted beams, the apodized first TVBG and the second TVBG each being configured with a bell-shaped profile of RIM recorded in a direction perpendicular to a grating vector of each of the apodized first TVBG and the second TVBG.

13. The spectral beam combiner of claim 1, wherein the first and second broadband beams each have a spectral width ranging between 3 and 10 nm.

14. The spectral beam combiner of claim 1, wherein the first broadband beam and the second broadband beam each are a single transverse mode beam or multimode beam.

15. The spectral beam combiner of claim 1, wherein the first TVBG and the second TVBG cach are configured with a grating vector ($K_G$) which is inclined at an arbitrary angle to a surface pormal.

16. The spectral beam combiner of claim 1, wherein the first and second central wavelengths each are selected from a 205-3500 nm wavelength range.

* * * * *